(12) United States Patent
Long

(10) Patent No.: US 7,325,475 B2
(45) Date of Patent: Feb. 5, 2008

(54) MODULAR STRUCTURE

(75) Inventor: Brian Keith Long, Madison, AL (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 11/491,401

(22) Filed: Jul. 20, 2006

(65) Prior Publication Data

US 2006/0254412 A1 Nov. 16, 2006

Related U.S. Application Data

(62) Division of application No. 10/824,249, filed on Apr. 13, 2004.

(51) Int. Cl.
*F41F 5/24* (2006.01)
(52) U.S. Cl. .................. 89/36.08; 89/40.13; 89/40.14; 296/24.33; 296/181.7
(58) Field of Classification Search ............... 89/36.07, 89/36.08, 40.13, 40.14; 296/24.33, 181.7, 296/186.4, 186.5
See application file for complete search history.

(56) References Cited

U.S. PATENT DOCUMENTS

| | | |
|---|---|---|
| 2,015,868 A | 10/1935 | O'Kieffe |
| 2,317,392 A | 4/1943 | Lord |
| 2,606,058 A | 8/1952 | Chausson |
| 2,889,752 A | 6/1959 | Meyer |
| 3,930,680 A | 1/1976 | Littlefield |
| 3,975,046 A | 8/1976 | Dutil |
| 4,053,073 A | 10/1977 | Franchin |
| 4,221,426 A | 9/1980 | Wardill |
| 4,283,086 A | 8/1981 | Morin |
| 4,309,055 A | 1/1982 | Law |
| 4,351,558 A | 9/1982 | Mueller |
| 4,644,705 A | 2/1987 | Saccomani et al. |
| 4,743,059 A | 5/1988 | Legueu |
| 4,748,790 A | 6/1988 | Frangolacci |
| 4,779,514 A | 10/1988 | Prigmore et al. |
| 5,142,997 A | 9/1992 | DeLong et al. |
| 5,220,127 A | 6/1993 | Tiomkin et al. |
| 5,237,784 A | 8/1993 | Ros |

(Continued)

FOREIGN PATENT DOCUMENTS

GB 2345069 A 6/2000

OTHER PUBLICATIONS dictionary.com definition for the term "module".*

(Continued)

*Primary Examiner*—Stephen M Johnson
(74) *Attorney, Agent, or Firm*—Banner & Witcoff, Ltd

(57) ABSTRACT

A modular structure is disclosed that includes a variety of separate units having an armored panel secured to a frame portion. The units, which exhibit a variety of shapes and dimensions, may be joined together to form modular structures with different configurations. For example, the units may be joined together to form an enclosed modular structure with a box-like configuration that is loaded onto a bed of a conventional truck for the transportation of troops or equipment. When joined, the various frame portions form a frame that extends around the modular structure and provides support, and the various panels are positioned adjacent to each other to form a shell that encloses the individuals or equipment.

21 Claims, 24 Drawing Sheets

U.S. PATENT DOCUMENTS

| | | |
|---|---|---|
| D343,824 S | 2/1994 | Halwes |
| 5,319,904 A | 6/1994 | Pascoe |
| 5,377,577 A | 1/1995 | Bounkong et al. |
| 5,555,681 A | 9/1996 | Cawthon |
| 5,591,933 A * | 1/1997 | Li et al. .................... 89/36.02 |
| 5,747,721 A | 5/1998 | Speakers et al. |
| 5,904,005 A | 5/1999 | Dyer et al. |
| 5,950,372 A | 9/1999 | Al-Sabah et al. |
| 5,966,956 A * | 10/1999 | Morris et al. ............... 62/259.1 |
| 5,970,843 A | 10/1999 | Strasser et al. |
| 5,971,177 A | 10/1999 | Carter |
| 6,030,683 A | 2/2000 | Chitrangad |
| 6,073,884 A | 6/2000 | Lavergne |
| 6,126,113 A | 10/2000 | Navickas |
| 6,464,446 B1 | 10/2002 | Hurler |
| 6,484,970 B2 | 11/2002 | Lin et al. |
| 6,502,788 B2 | 1/2003 | Noda et al. |
| 6,513,670 B2 * | 2/2003 | Minkkinen .................. 220/1.5 |
| 6,532,857 B1 | 3/2003 | Shih et al. |
| 6,601,497 B2 * | 8/2003 | Ghiorse et al. ............ 89/36.02 |
| 6,612,217 B1 | 9/2003 | Shockey et al. |
| 6,679,009 B2 | 1/2004 | Hotes |
| 6,742,309 B2 | 6/2004 | Stewart et al. |
| 7,021,009 B2 | 4/2006 | Johnson |
| 2005/0235819 A1 | 10/2005 | Long |

OTHER PUBLICATIONS

PCT Search Report dtd Feb. 22, 2007, PCT/US05/11917.

* cited by examiner

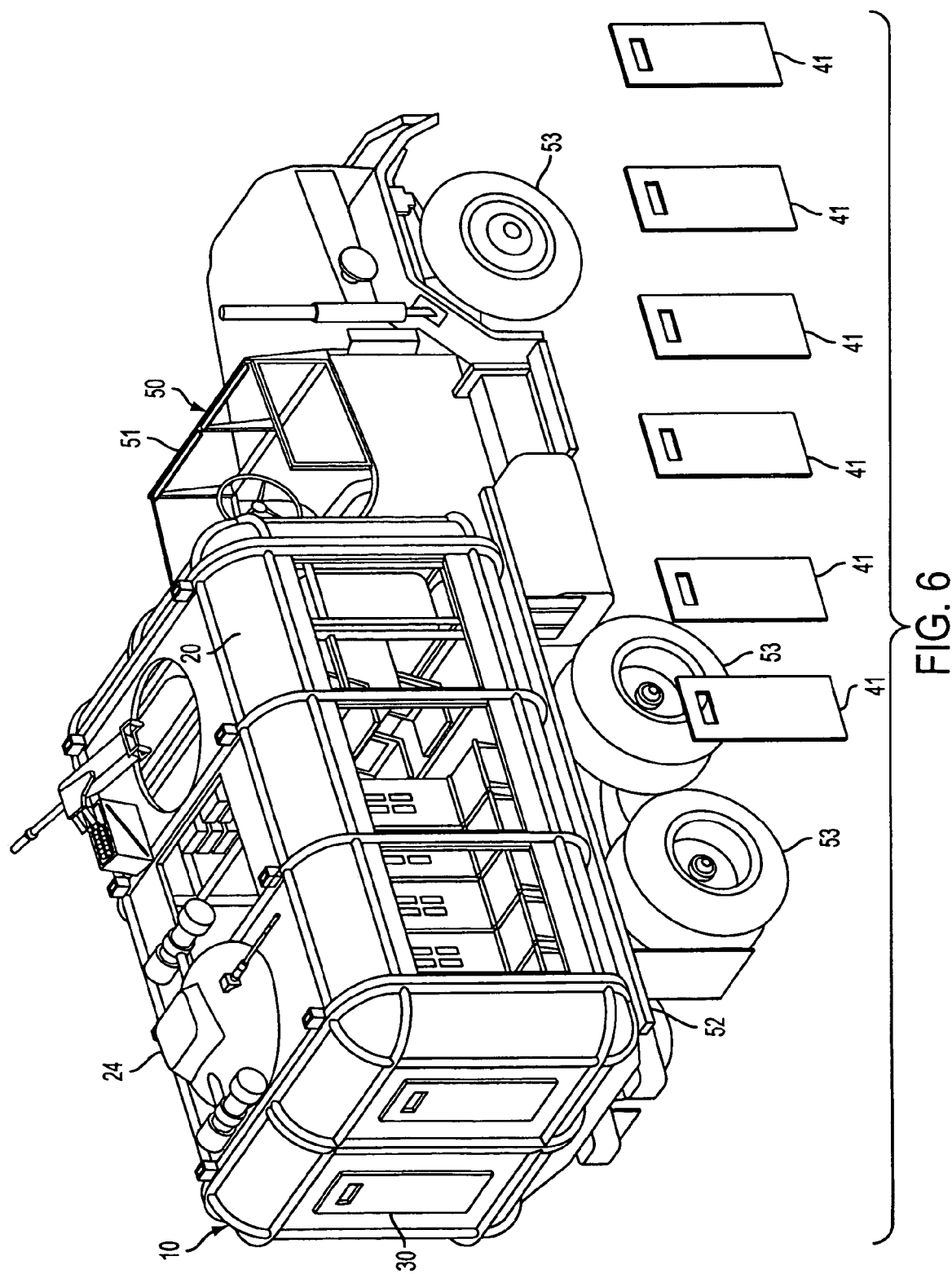

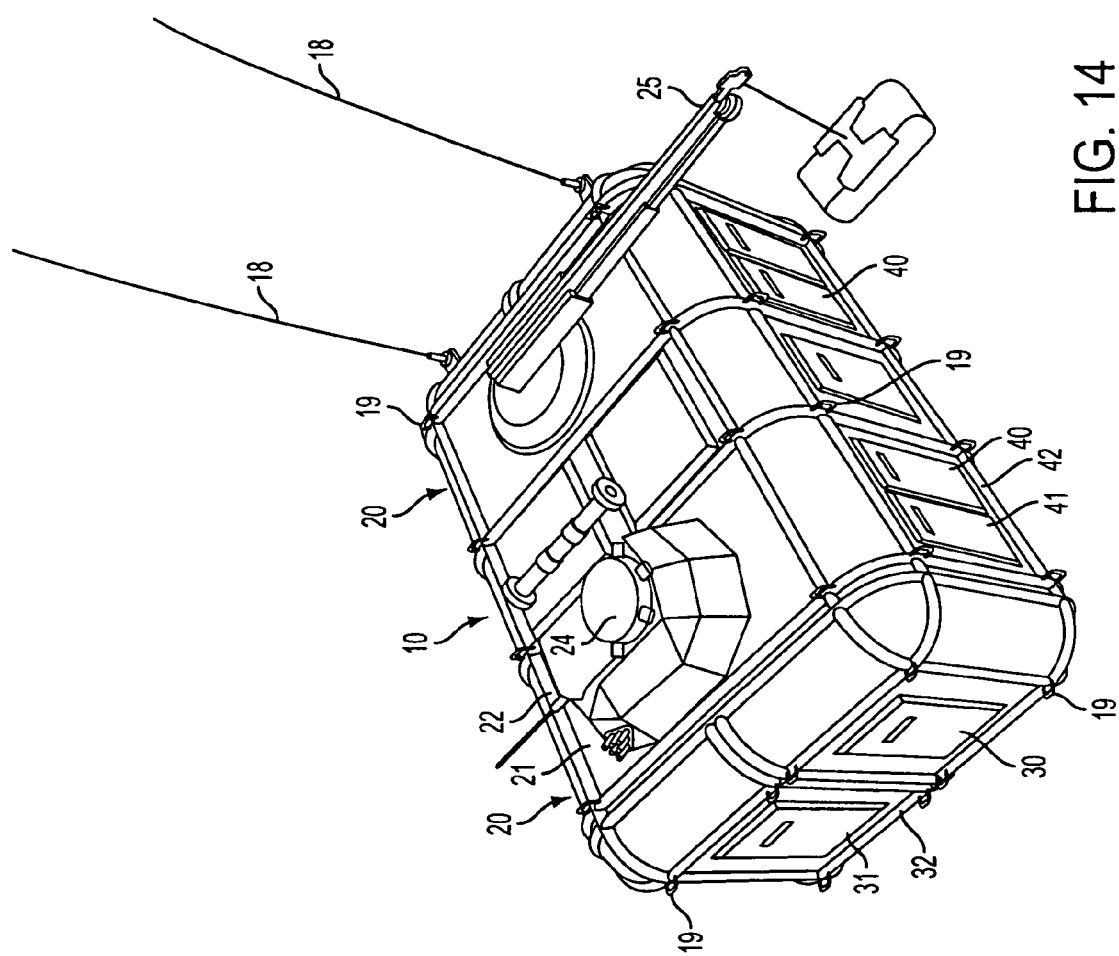

MODULAR STRUCTURE

CROSS-REFERENCE TO RELATED APPLICATION

This U.S. patent application is a divisional application of and claims priority to U.S. patent application Ser. No. 10/824,249, which was filed in the U.S. Patent and Trademark Office on Apr. 13, 2004 and entitled Modular Structure, such prior U.S. patent application being entirely incorporated herein by reference.

BACKGROUND OF THE INVENTION

1. Field of the Invention

The present invention relates to a modular structure formed from a plurality of discrete units that are joinable to form an enclosed structure for receiving individuals and equipment.

2. Description of Background Art

During military operations, a conventional method of transporting individuals, such as troops, and equipment on the ground generally involves trucks with a shallow bed, in which the individuals and equipment are located. Bench seating is provided along sides of the bed such that the individuals face inward toward a center area of the bed. The conventional truck may also be fitted with a bow and tarpaulin kit that covers the bed and provides limited protection from the elements. Although this method of transportation is commonly utilized in hostile environments, few protective devices (i.e., armor and seatbelts) are present to protect the individuals and equipment from hostilities and truck roll-overs. In addition to utilizing trucks, individuals may be transported in armored personnel carriers, although this method of transportation is utilized with less frequency and holds a lesser number of individuals and equipment. Once the individuals arrive at a remote location, housing and defensive structures are often constructed from materials that are purchased or otherwise obtained at the remote location.

SUMMARY OF THE INVENTION

The present invention relates to a modular structure suitable for transporting and supporting military operations in remote locations, but may also be adapted for non-military or other civilian purposes. The modular structure incorporates a variety of discrete units that each include an armored panel that is secured to a frame portion. The units, which exhibit a variety of shapes and dimensions, may be joined together to form a plurality of modular structures with different shapes and dimensions. When joined, the various frame portions form a frame that extends around the modular structure and provides support, and the various armored panels are positioned adjacent to each other to form a shell that encloses the individuals or equipment.

A plurality of seats may be secured to an interior of the modular structure such that the troops face outward, and removable units in sides of the structure may provide ports for viewing, ventilation, or protection. In addition, copulas for mounting weaponry may be incorporated into selected units. In situations where heavy equipment is transported in the modular structure, a crane may be mounted to one of the copulas.

Once the individuals or equipment arrive at a remote location, the modular structure may be removed from the bed of the conventional truck (e.g., with a lifting system incorporated into sides of the modular structure) and modified, as necessary, to serve a variety of functions. For example, the modular structure may be utilized as living quarters, a check point, or a secure structure for storing equipment. Multiple modular structures may also be joined together to form a larger enclosed and modular structure that is suitable for use as a command post or medical clinic. The modular structure may also be disassembled, and the various units may be distributed around a tactical operations center to provide protection. Accordingly, the modular structure may be utilized alone or in combination with other modular structures to (i) transport individuals and equipment and (ii) support the individuals and equipment at the remote location. The modular structure may also be buried or otherwise entrenched within the ground for enhanced overhead protection and a lowered profile.

The advantages and features of novelty characterizing the present invention are pointed out with particularity in the appended claims.

DESCRIPTION OF THE DRAWINGS

The foregoing Summary of the Invention, as well as the following Detailed Description of the Invention, will be better understood when read in conjunction with the accompanying drawings.

FIG. 6 is a perspective of the modular structure in combination with a transport.

FIG. 14 is a perspective view of the modular structure with a crane.

DETAILED DESCRIPTION OF THE INVENTION

Figure 1:
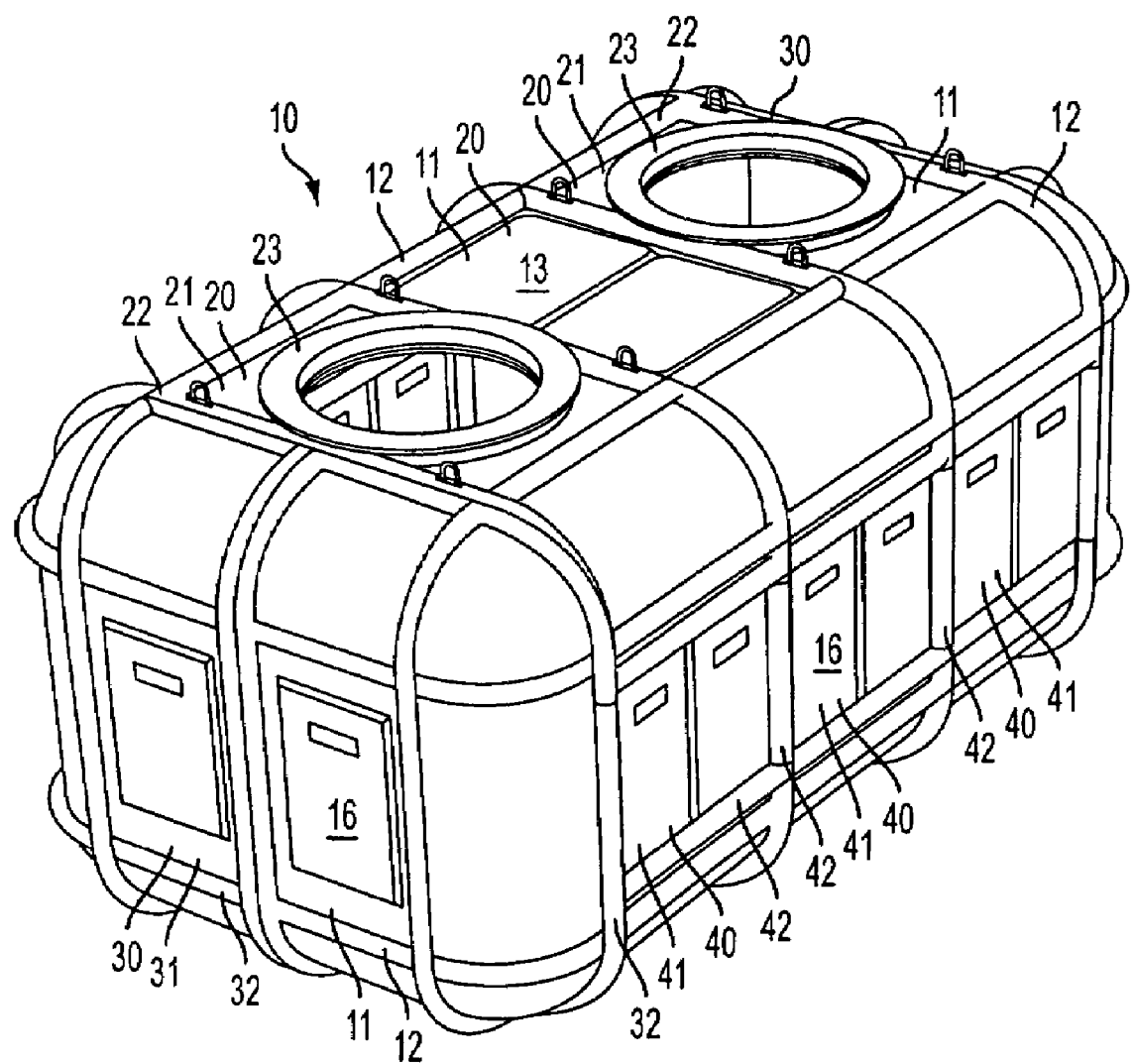
FIG. 1 is a perspective view of a modular structure in accordance with the present invention.
Figure 2:
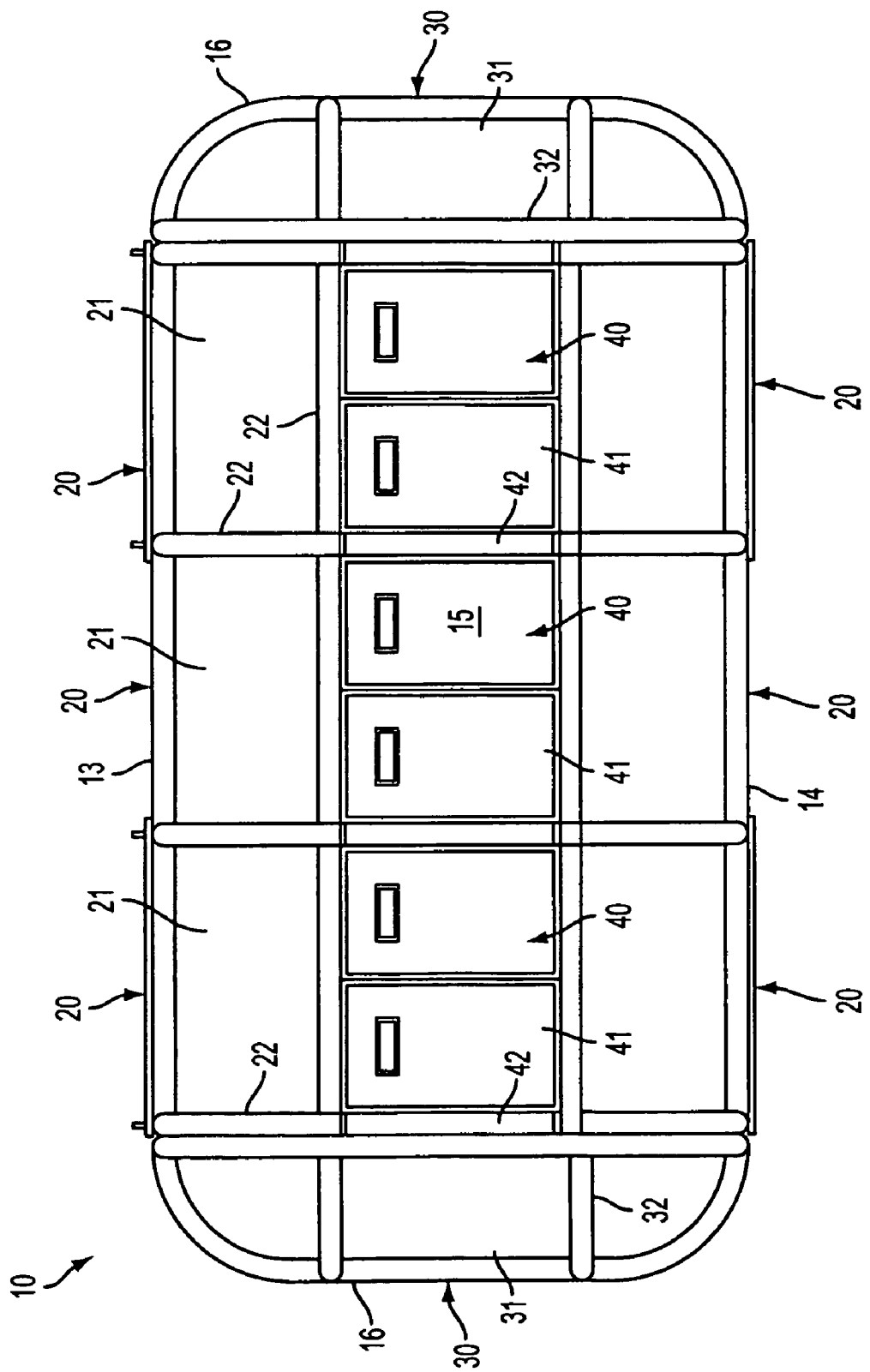
FIG. 2 is a side elevational view of the modular structure.
Figure 3:
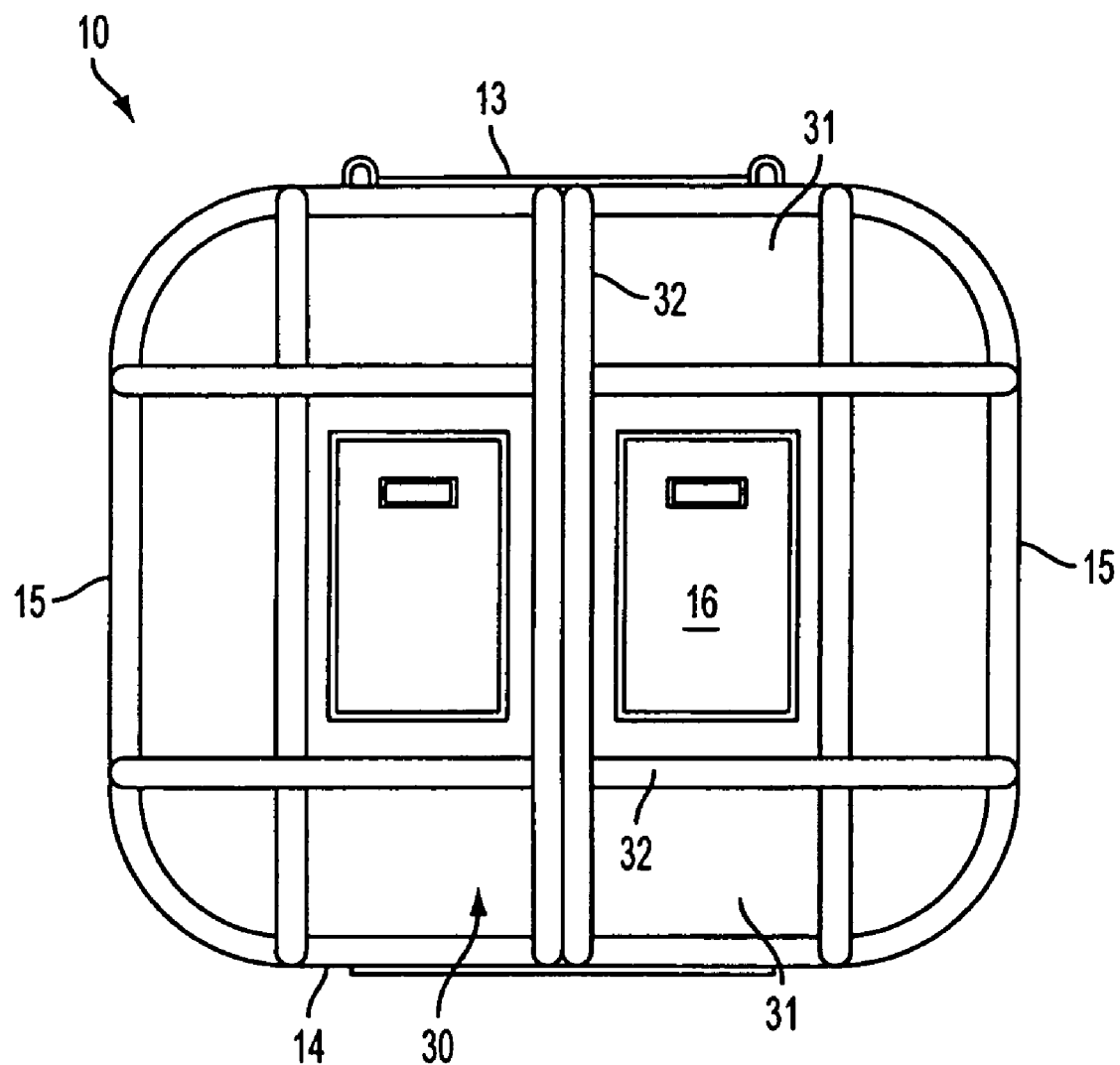
FIG. 3 is an end elevational view of the modular structure.
Figure 4:
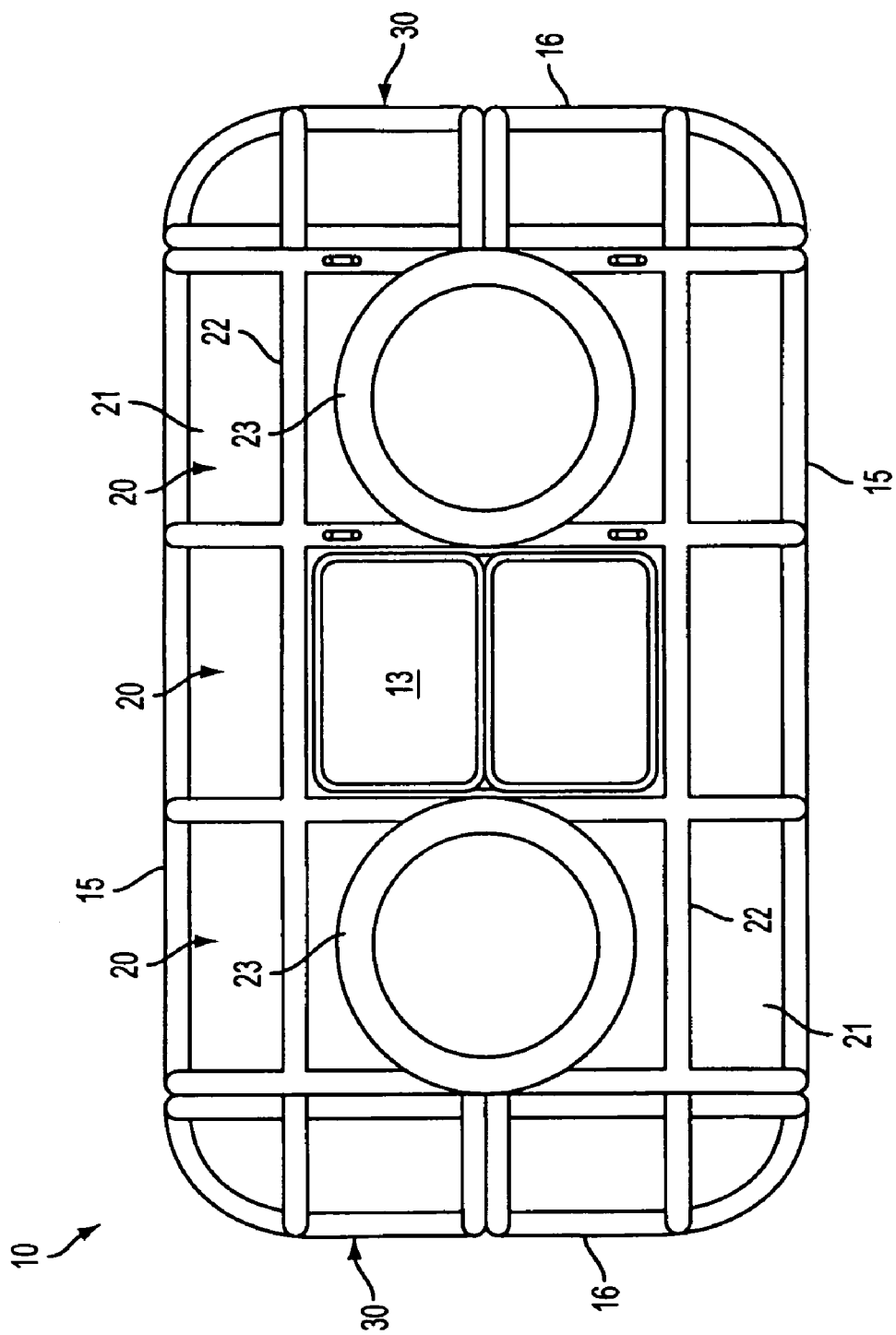
FIG. 4 is a top plan view of the modular structure.
Figure 5A:
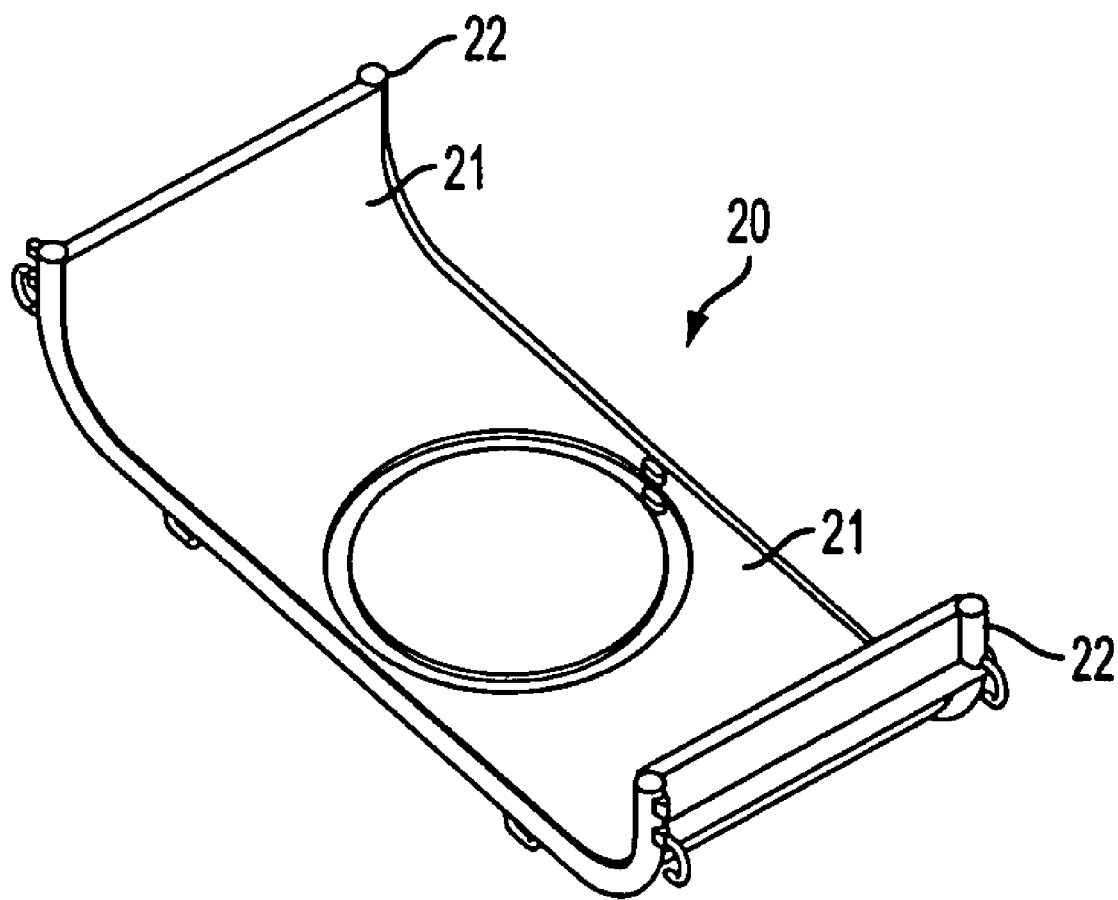
FIG. 5A is a perspective view depicting a first step in an assembly process for the modular structure.
Figure 5B:
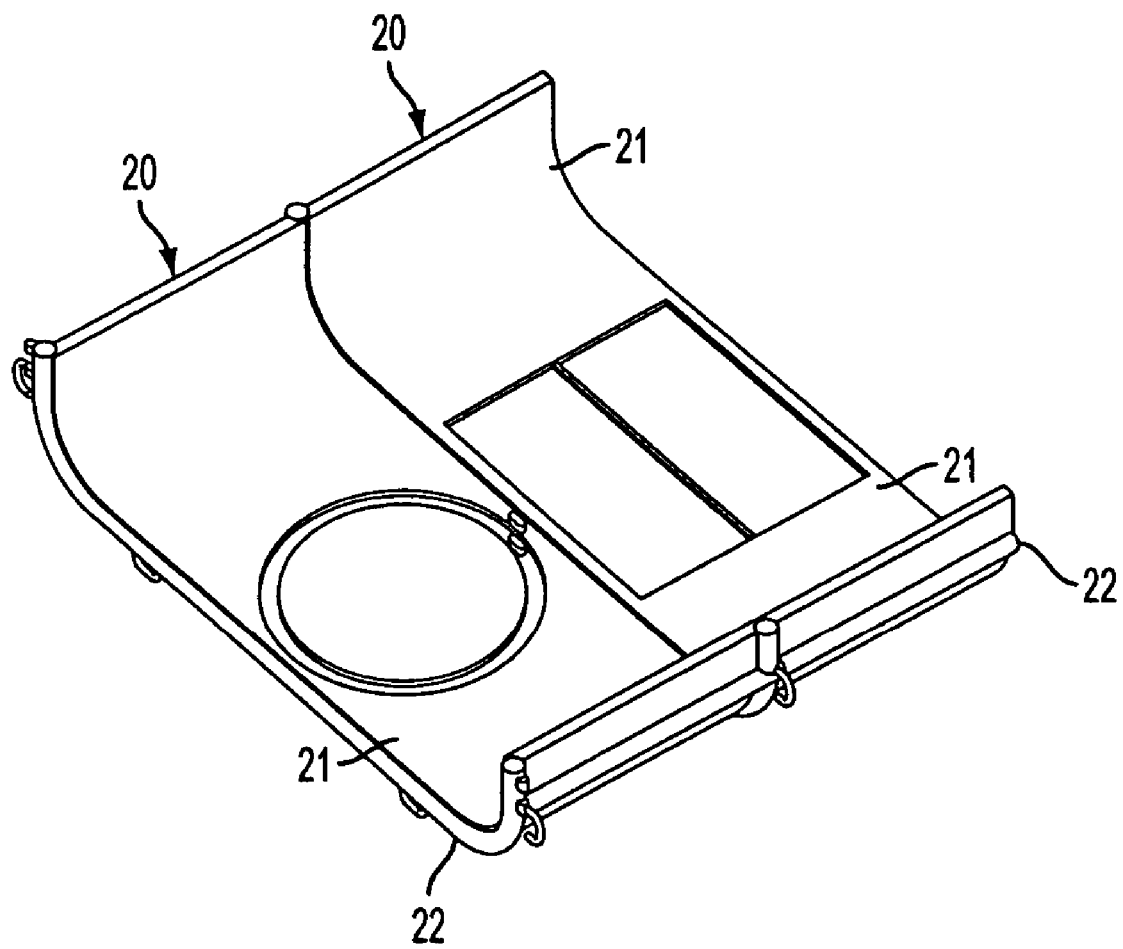
FIG. 5B is a perspective view depicting a second step in the assembly process for the modular structure.
Figure 5C:
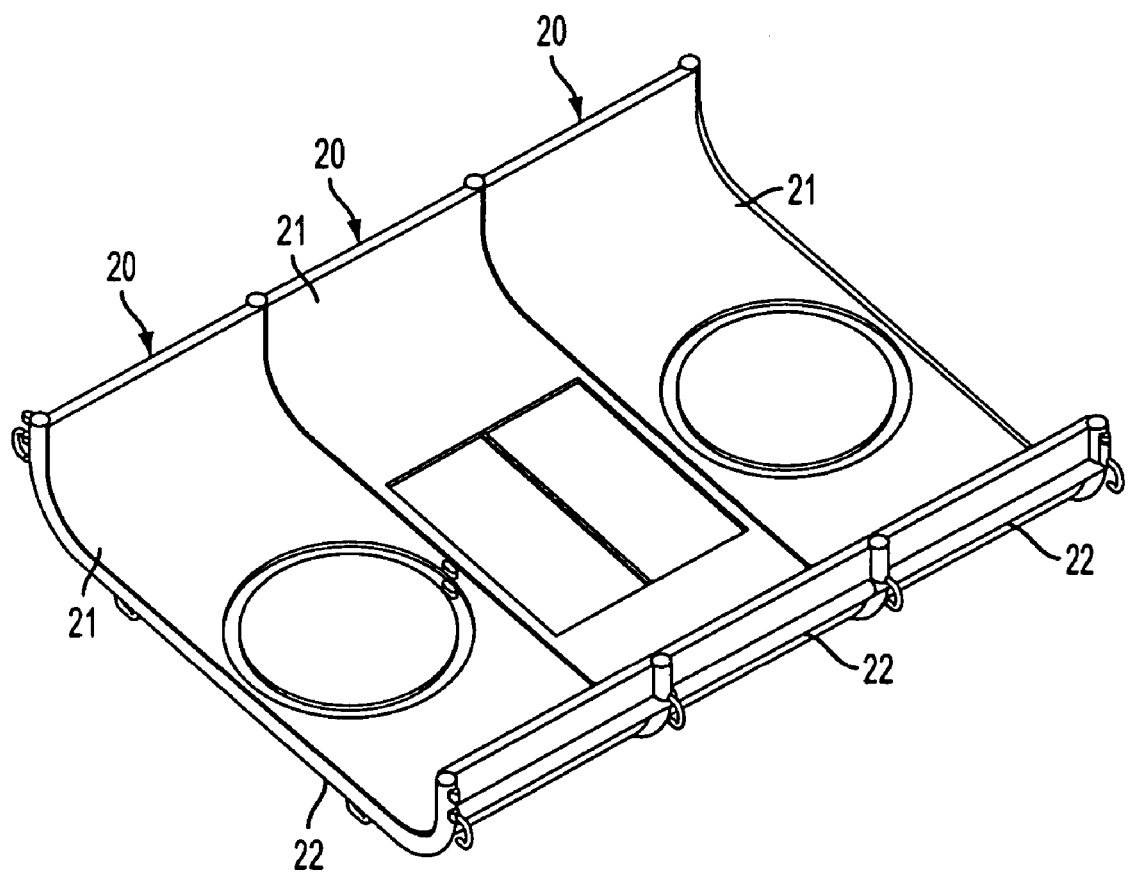
FIG. 5C is a perspective view depicting a third step in the assembly process for the modular structure.
Figure 5D:
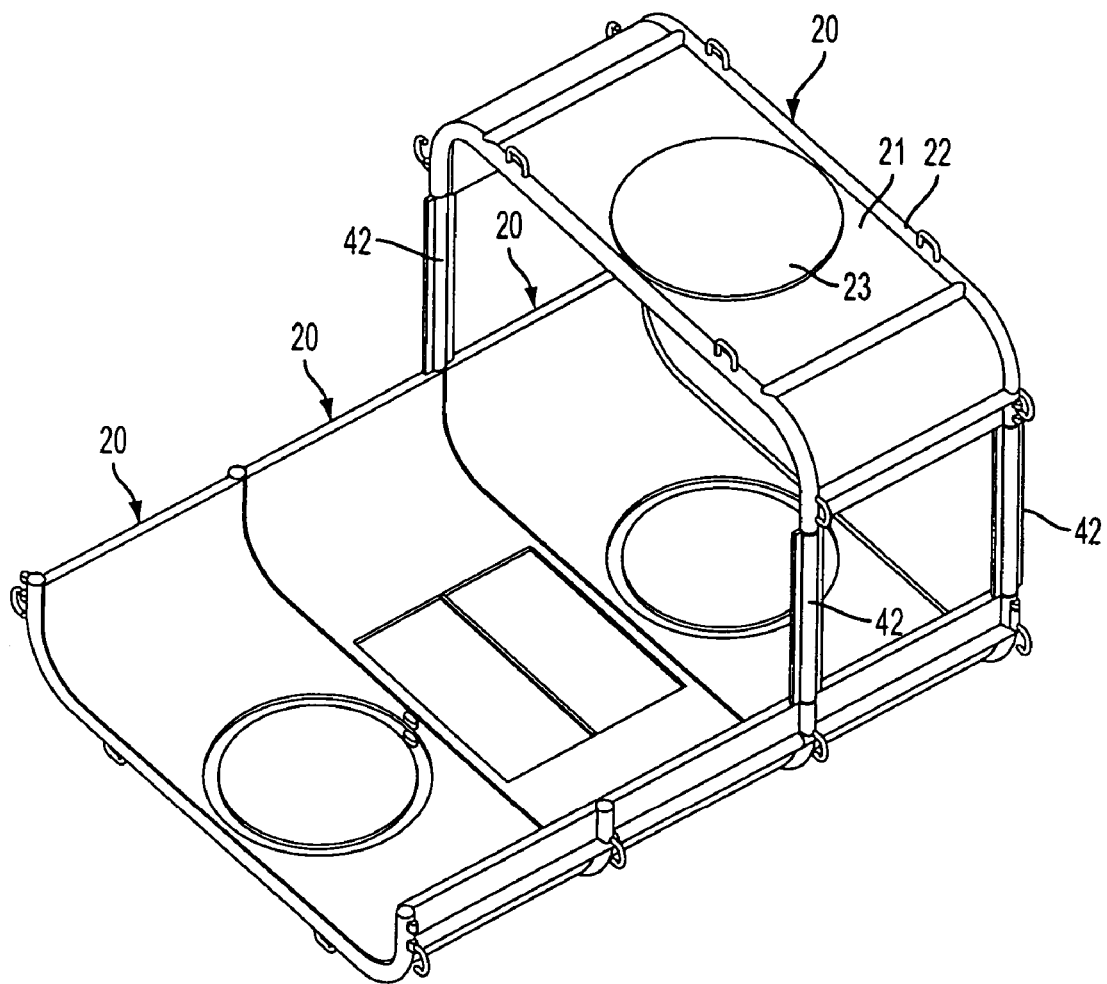
FIG. 5D is a perspective view depicting a fourth step in the assembly process for the modular structure.
Figure 5E:
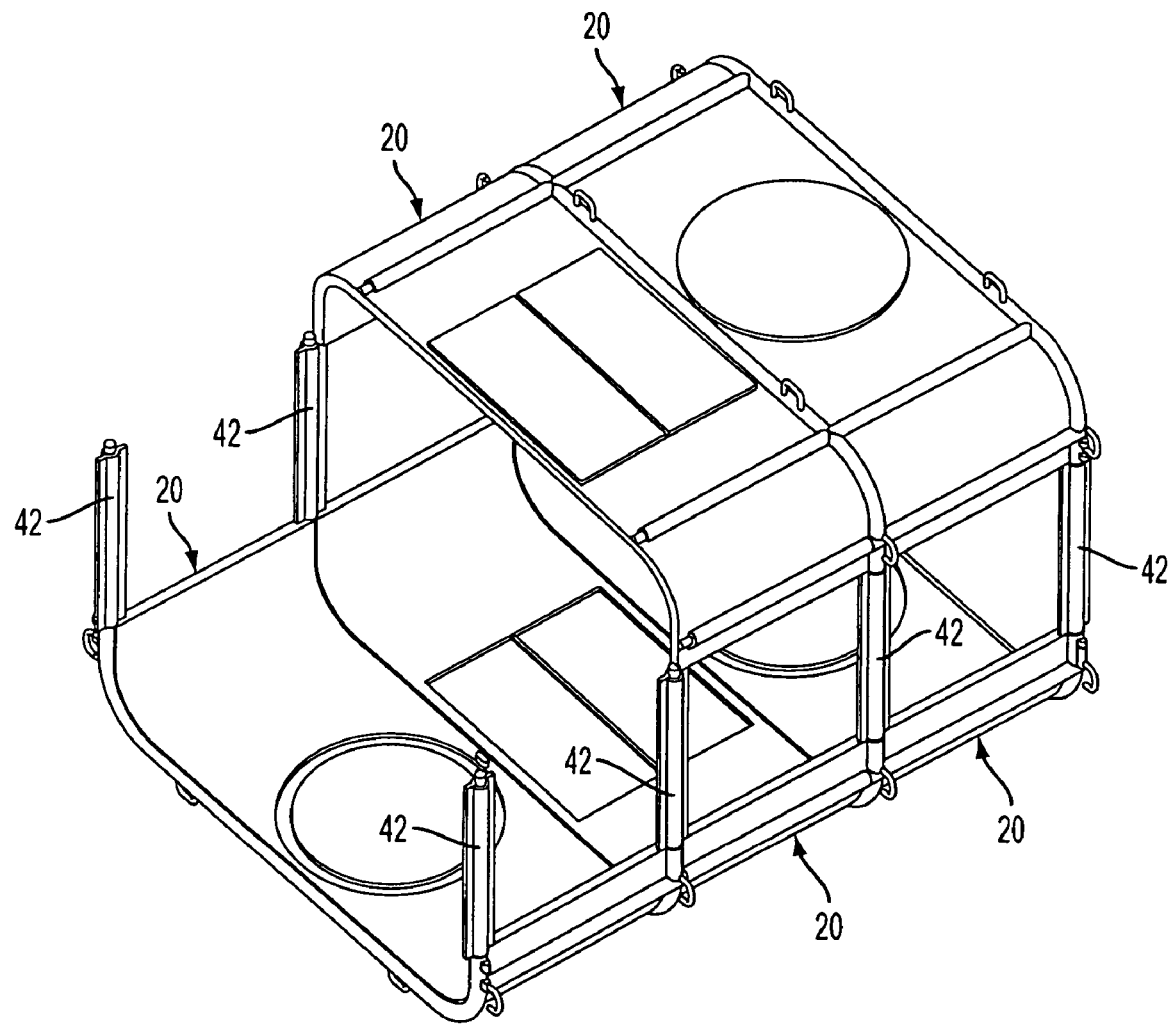
FIG. 5E is a perspective view depicting a fifth step in the assembly process for the modular structure.
Figure 5F:
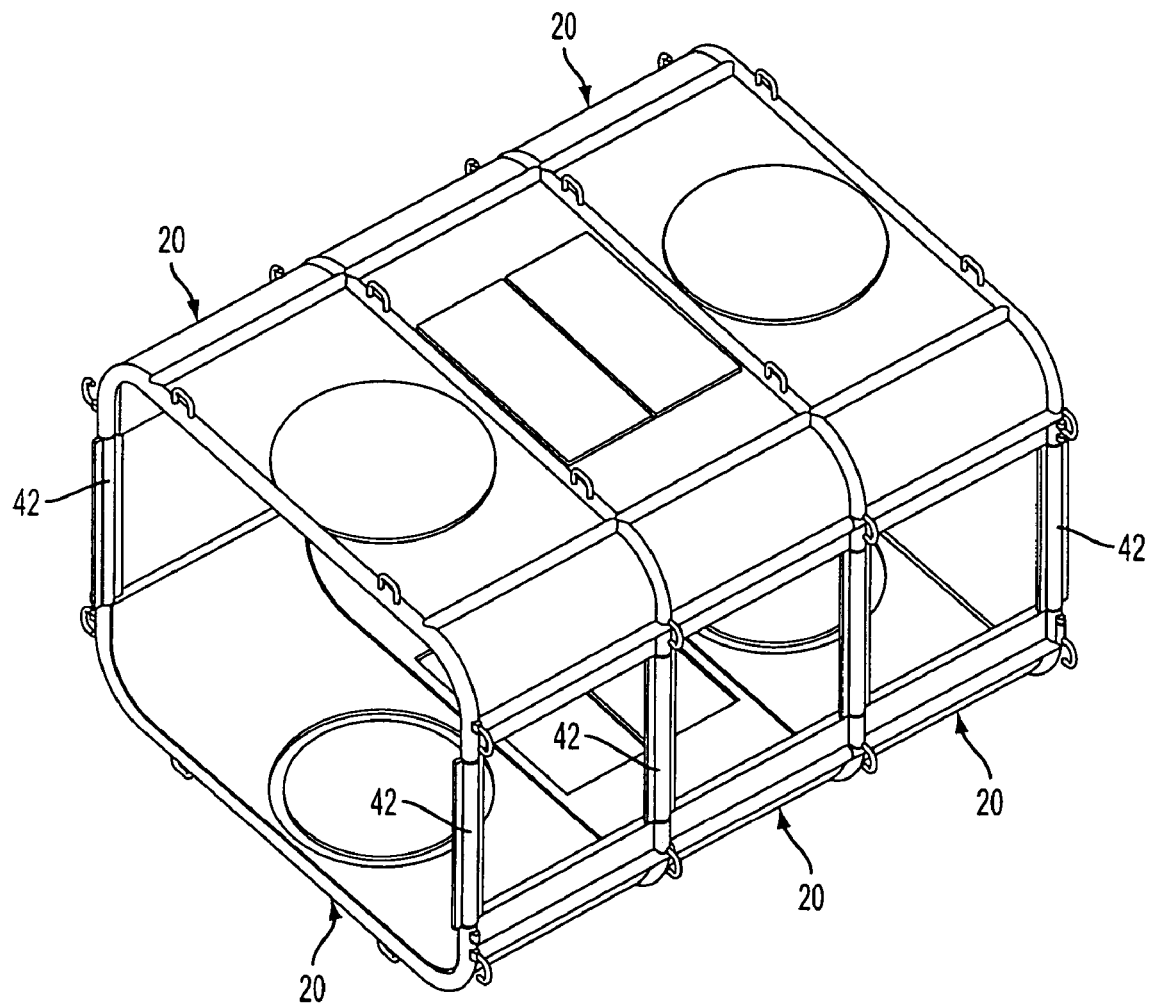
FIG. 5F is a perspective view depicting a sixth step in the assembly process for the modular structure.
Figure 5G:
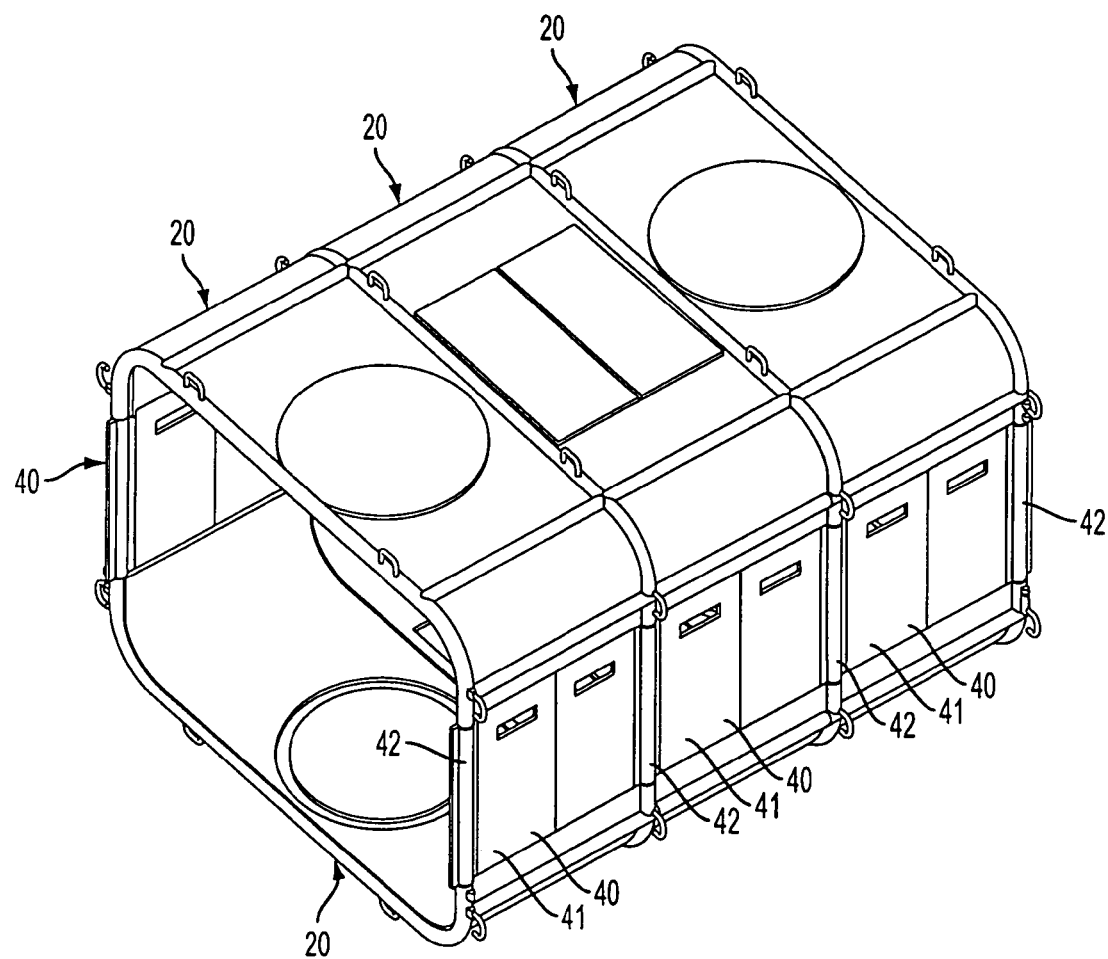
FIG. 5G is a perspective view depicting a seventh step in the assembly process for the modular structure.
Figure 5H:
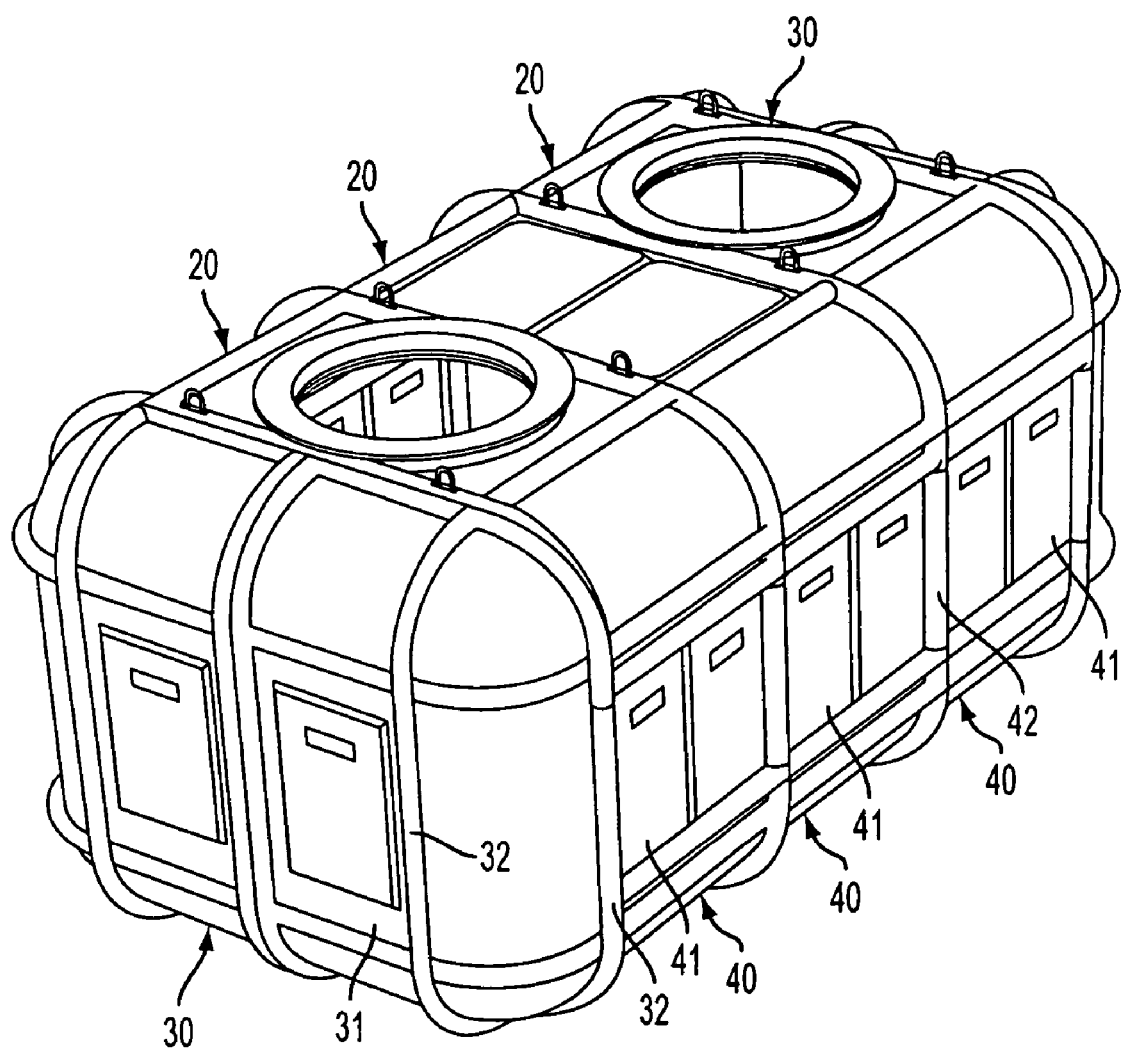
FIG. 5H is a perspective view depicting an eighth step in the assembly process for the modular structure.

The following discussion and accompanying figures disclose a variety of modular structures and systems for utilizing the modular structures, in accordance with the present invention. The modular structures, and the various units forming the modular structures, are suitable for transporting and supporting military operations, for example, but may also be adapted for non-military or other civilian purposes. For purposes of example, however, the following material discloses the modular structures in the context of military operations.

An exemplary modular structure 10 is depicted in FIGS. 1-4 as exhibiting a generally rectangular or box-like configuration, with corners and edges of modular structure 10 being rounded or otherwise filleted. The primary elements of modular structure 10 are a shell 11 and a frame 12. The box-like configuration of modular structure 10 defines an upper portion 13, a lower portion 14, a pair of sidewall portions 15, and a pair of end portions 16. Rather than being precisely-defined areas of modular structure 10, portions 13-16 are general areas of modular structure 10 that are intended to provide a frame of reference in the following discussion. Whereas modular structure 10 may exhibit dimensions that include a height of 5.5 feet, a width of 7.5 feet, and a length of 12 feet, other modular structures may exhibit greater or lesser dimensions and may have a shape that departs significantly from the box-like configuration of modular structure 10. Accordingly, the specific configuration of modular structure 10, as depicted in the figures, is intended to provide an example of the variety of modular structure configurations intended to fall within the scope of the present invention.

Shell 11 forms an enclosure that defines a void within modular structure 10 for receiving individuals, such as troops, and equipment. As will be described in greater detail below, the individuals and equipment may be transported within modular structure 10 and are located, therefore, within the void defined by the enclosure of shell 11. In general, shell 11 is formed from or augmented with an armored material that protects the individuals and equipment from fire, nearby explosions, and small arms projectiles, for example. Accordingly, suitable materials for shell 11 include various polymers and metals, such as steel and aluminum, with thicknesses that are selected to provide a desired degree of protection. Additional suitable materials include a variety of composites formed from a polymer reinforced with a fiber that exhibits relatively high tensile strength. More particularly, shell 11 may be formed from or augmented with a polymer reinforced with a para-aramid fiber, which is manufactured by E.I. duPont de Nemours and Company under the KEVLAR® trademark. Accordingly, shell 11 may be formed from a variety of materials.

Frame 12 extends around shell 11 and provides structural support or otherwise strengthens the enclosure formed by shell 11. Although frame 12 may be positioned on an interior of shell 11, frame 12 is depicted as extending around an exterior of shell 11, and may be secured to the exterior of shell 11 through a variety of conventional attachment methods. Positioning frame 12 on the exterior of shell 11 increases the overall volume of the void within shell 11 and imparts a generally smooth aspect to the interior of shell 11. Frame 12 may be formed, for example, from a plurality of tubular steel elements having a diameter of approximately 3 inches. The tubular steel elements of frame 12 may be box-framed such that ninety degree angles are formed between the various tubular steel elements that are welded or otherwise joined together.

Modular structure 10, and particularly shell 11 and frame 12, is formed from a plurality of discrete units 20, 30, and 40 that are joined together. Units 20, 30, and 40 are separable from modular structure 10 and interchangeable with similar units from other modular structures that have the general configuration of modular structure 10. Accordingly, the various units 20, 30, and 40 may be disassembled and combined with additional units 20, 30, and 40 to form a modular structure having other dimensions or a different configuration, as described in greater detail below.

Each unit 20 includes an armored panel 21 and a frame portion 22 that is secured to panel 21. As discussed above, the primary elements of modular structure 10 are shell 11 and frame 12, and modular structure 10 is formed from a plurality of discrete units 20, 30, and 40 that are joined together. Each unit 20 forms, therefore, a portion of shell 11 and frame 12. More particularly, each panel 21 forms a section of shell 11, and each frame portion 22 forms a corresponding section of frame 12. Similarly, each unit 30 includes an armored panel 31 and a frame portion 32 that is secured to panel 31, and each unit 40 includes an armored panel 41 and a frame portion 42 that is secured to panel 41. As with units 20, panels 31 and 41 form sections of shell 11, and frame portions 32 and 42 form corresponding sections of frame 12. When joined together in the manner depicted in the figures, units 20, 30, and 40 cooperatively form shell 11 and frame 12.

Units 20 form upper portion 13 and lower portion 14 of modular structure 10. More particularly, three units 20 form upper portion 13, and three additional units 20 form lower portion 14. Each unit 20 has a central area that exhibits a generally planar configuration. Each unit 20 also has a pair of end areas located on opposite sides of the central area. The end areas have a curved configuration, which are due to a curvature in panels 21 and frame portions 22, and form a transition between upper portion 13 and sidewall portions 15.

Frame portions 22 extend at least partially around perimeter areas of panels 21. This configuration imparts additional support to panels 21 in the perimeter areas. In addition, this configuration locates frame portions 22 in areas of units 20 that are adjacent to other units 20, 30, and 40. Frame portions 22 may be joined, therefore, with other frame portions 22, 32, and 42 in order to join units 20, 30, and 40 together and form modular structure 10. As discussed above, units 20, 30, and 40 are separable from modular structure 10 and interchangeable with similar units from other modular structures. Accordingly, the manner of joining units 20, 30, and 40 together should also permit units 20, 30, and 40 to be separated. One suitable manner of joining units 20, 30, and 40 together involves pins that extend through frame portions 22, 32, and 42. That is, units 20, 30, and 40 may be joined by merely extending a pin through predefined apertures in the various frame portions 22, 32, and 42 that are located adjacent to each other. Another suitable manner of joining units 20, 30, and 40 together involves protrusions on specific areas of frame portions 22, 32, and 42 that extend into corresponding apertures in adjacent frame portions 22, 32, and 42. Further joining methods, including temporary welds and bolting structures, for example, may also be utilized to join the various units 20, 30, and 40.

The specific configuration of each unit 20 may vary depending upon the intended location of each unit 20 with respect to modular structure 10. Referring to FIG. 1, for example, upper portion 13 of modular structure 10 is depicted as having three units 20. Two of the units 20 are positioned adjacent end portions 16, and one of the units 20 is centrally-located with respect to end portions 16. Whereas frame portions 22 of the units 20 that are positioned adjacent to end portions 16 extend entirely around the perimeter areas, the frame portion 22 of the central unit 20 extends only across the end areas. This configuration provides a single tubular steel element at each interface between the various units 20. A further difference is that each of the units 20 that are positioned adjacent the end portions 16 incorporate a copula 23, thereby forming a mount for a weapons system or a crane, for example.

Units 30 form end portions 16 and have a central area that exhibits a generally planar configuration. Each unit 30 also defines a perimeter area extending around the central area. The perimeter area has a curved configuration that forms a transition between end portions 16 and each of upper portion 13, lower portion 14, and sidewall portions 15. Frame portions 32 extend at least partially around the perimeter areas of panels 31. This configuration imparts additional support to panels 31 in the perimeter areas. In addition, this configuration locates frame portions 32 in areas of units 30 that are adjacent to other units 20 and 40. In addition to extending around the perimeter areas of panels 31, sections of frame portions 32 also extend vertically and horizontal through the central areas to provide additional support and strength to panels 31.

As with units 20, a variety of suitable structures may be utilized to join each unit 30 with adjacent units 20 and 30. Accordingly, pins, protrusions and apertures, temporary welds, and bolting structures, for example, may be utilized to join units 20, 30, and 40 together such that units 20, 30, and 40 are separable from modular structure 10 and interchangeable with similar units from other modular structures. The interior of modular structure 10 defines a void for receiving individuals and equipment. At least one of units 20, 30, and 40 may, therefore, have a configuration that provides access to the interior of modular structure 10, thereby permitting the individuals and equipment to enter and exit the void. As an alternative to the joining structures discussed above, a hinged connection may be utilized for units 30 in order to effectively form an access point to the void within modular structure 10. That is, one or both of units 30 may be joined to adjacent units 20 and 40 through a hinged connection that permits access to the void.

Units 40 form sidewall portions 15 of modular structure 10. More particularly, three units 40 form one sidewall portion 15, and three additional units 40 form the opposite sidewall portion 15. Each panel 41 exhibits a generally planar and rectangular shape, and frame portions 42 extend along opposite vertical sides of panels 41. Whereas panels 21 and 31 are secured to frame portions 22 and 32, respectively, panels 41 are separable from frame portions 42 in order to form portals in sidewall portions 15. That is, panels 41 may be selectively removed from shell 11 in order to provide openings in modular structure 10 for viewing or ventilation, for example. As an alternative, panels 42 may be secured to frame portions 42 through a hinged structure such that panels 42 rotate downward and into modular structure 10, for example. As with units 20 and 30, a variety of suitable structures may be utilized to join each unit 40 with adjacent units 20 and 30. Accordingly, pins, protrusions and apertures, temporary welds, and bolting structures, for example, may be utilized to join units 20, 30, and 40 together such that units 20, 30, and 40 are separable from modular structure 10 and interchangeable with similar units from other modular structures.

Further understanding regarding the structure of units 20, 30, and 40 and the manner in which units 20, 30, and 40 are joined to form modular structure 10 may be gained with reference to FIGS. 5A-5H, which depict steps in an assembly process for modular structure 10. An initial step in the assembly process (see FIG. 5A) involves positioning a first unit 20 to form one-third of lower portion 14. An adjacent, second unit 20 is joined with the first unit 20 (see FIG. 5B), and a third unit 20 is subsequently joined with the second unit 20 (see FIG. 5C), thereby substantially forming lower portion 14. Four frame portions 42 are then joined with the third unit 20 so as to extend vertically from the third unit 20, and a fourth unit 20 is joined with each of the four frame portions to form one-third of upper portion 13 (see FIG. 5D). Additional frame portions 42 are then joined with lower portion 14 to provide support for a fifth unit 20 (see FIG. 5E) and a sixth unit 20 (see FIG. 5F). Once frame portions 42 are disposed between the units 20 forming upper portion 13 and the units 20 forming lower portion 14, six panels 41 may be joined with frame portions 42 in order to complete the formation of sidewall portions 15 (see FIG. 5G). Each of units 30 are then joined with units 20 and 40 to form end portions 16 (see FIG. 5H). As discussed above, units 30 may be joined through a hinged connection in order to permit access to the interior of modular structure 10. One skilled in the relevant art will recognize that the steps in the assembly process may be performed in other orders to form modular structure 10. In addition, the general assembly process may also be performed with a greater or lesser number of units 20, 30, and 40 in order to form modular structures having other dimensions or configurations.

When units 20, 30, and 40 are joined together to form modular structure 10, the various panels 21, 31, and 41 are positioned adjacent to each other in an abutting relationship. The adjacent edges of panels 21, 31, and 41 may form a lapped structure that prevents objects from penetrating modular structure 10 at the seams between panels 21, 31, and 41. The lapped structure may also incorporate additional reinforcing elements that further limit the degree to which objects or water may penetrate to the interior of modular structure 10.

Modular structure 10 may be utilized for the transportation of individuals and equipment. A variety of transports may be utilized for moving modular structure 10, and the contents therein, from a first location to a second, remote location. Suitable transports include, for example, a truck, railcar, airplane, or ship, for example. With reference to FIG. 6, a transport 50 is depicted in combination with modular structure 10. Transport 50 exhibits a substantially conventional configuration that includes a cab 51, a bed 52, and a plurality of wheels 53, for example. Cab 51 receives a driver who controls the operation of transport 50. Bed 52 is positioned behind cab 51, and wheels 53 extend under both cab 51 and bed 52 to provide rolling contact with the ground. Modular structure 10 is positioned on bed 52 and is dimensioned such that side portions of bed 52 extend upward along lower areas of sidewall portions 15, thereby securing modular structure 10 to transport 50. Additional methods of securing modular structure 10 to bed 52 may also be utilized.

During transport, modular structure 10 and transport 50 may be subject to hostile environments. Whereas conventional trucks with a shallow bed incorporate few protective devices, modular structure 10, particularly shell 11, is formed from or augmented with an armored material that protects the individuals and equipment from fire, nearby explosions, and small arms projectiles, for example. Various weapons systems 24 may also be mounted in one or both of copulas 23 to further protect the individuals. Suitable types of weapons systems 24 include a variety of conventional crew-served weapons and anti-tank weapons, for example.

Figure 7:
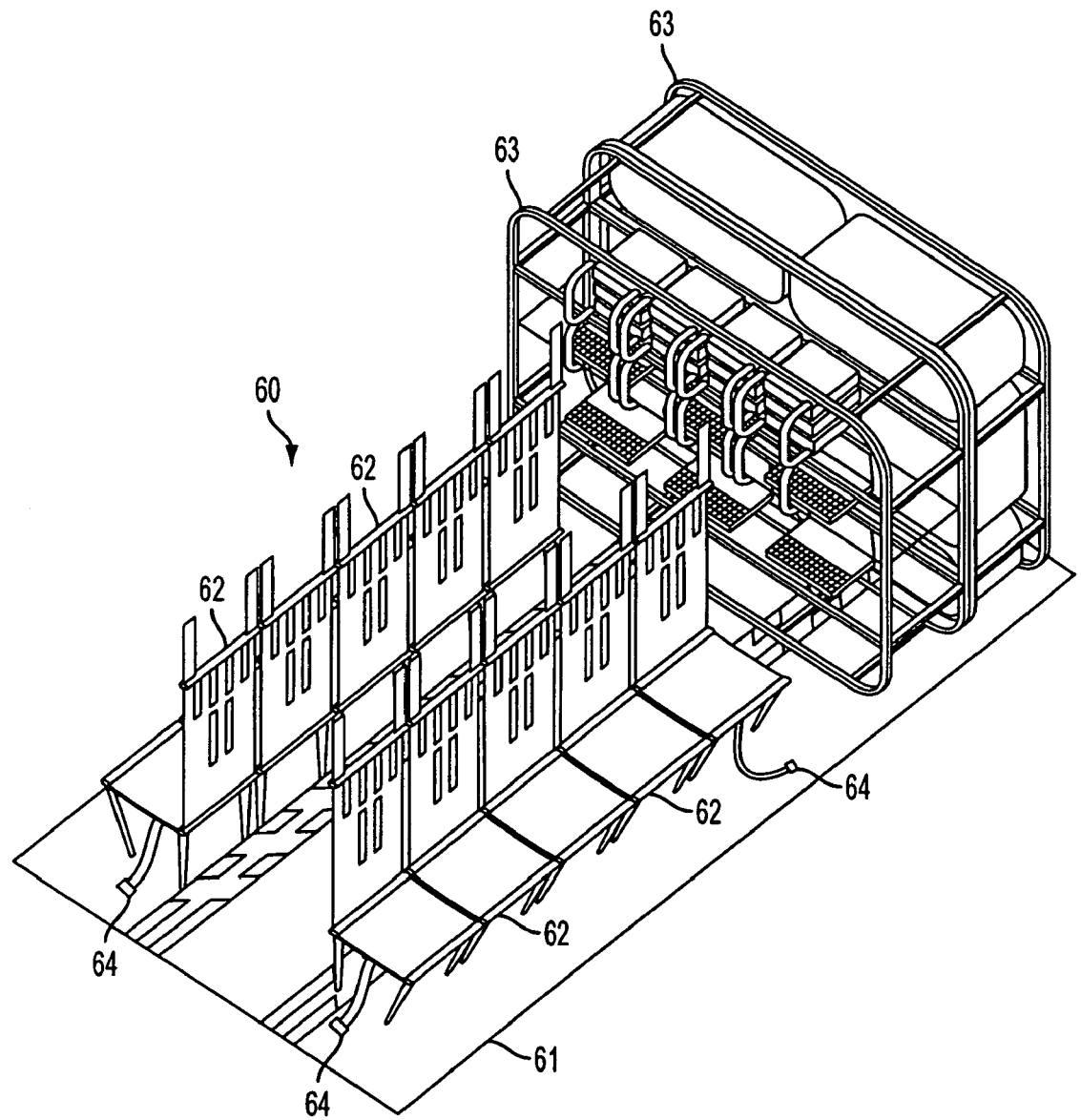
FIG. 7 is a perspective view of a seat pallet that may be placed within an interior of the modular structure.

The conventional trucks also incorporate foldable bench seating along sides of the bed such that the individuals face inward toward a center area of the bed. Referring to FIG. 7, a seat pallet 60 is depicted that includes a base 61, a plurality of seats 62, and two storage cells 63. Seat pallet 60 may be positioned within modular structure 10 to provide outward facing seats 62 for the individuals, thereby orienting the individuals for an enhanced defensive position for modular structure 10 and transport 50. Each of seats 62 may exhibit a structure that is similar to conventional aviation seats, which have a four-point connection system and are collapsible for purposes of storage. Seats 62 may also include seatbelts 64 for securing the positions of the individuals. Storage cells 63 may also be utilized for storing the equipment and providing ready access to the equipment.

Modular structure 10 may also be designed to protect the individuals in situations where transport 50 experiences a roll-over. Whereas the conventional trucks have a shallow bed, frame 12 may be designed with a strength that is sufficient to operate as a protective cage during a roll-over, thereby preventing transport 50 from injuring the individuals. In addition, seatbelts 64 may be included to secure the positions of the individuals relative to frame 12 in order to protect the individuals from injury.

Figure 8:
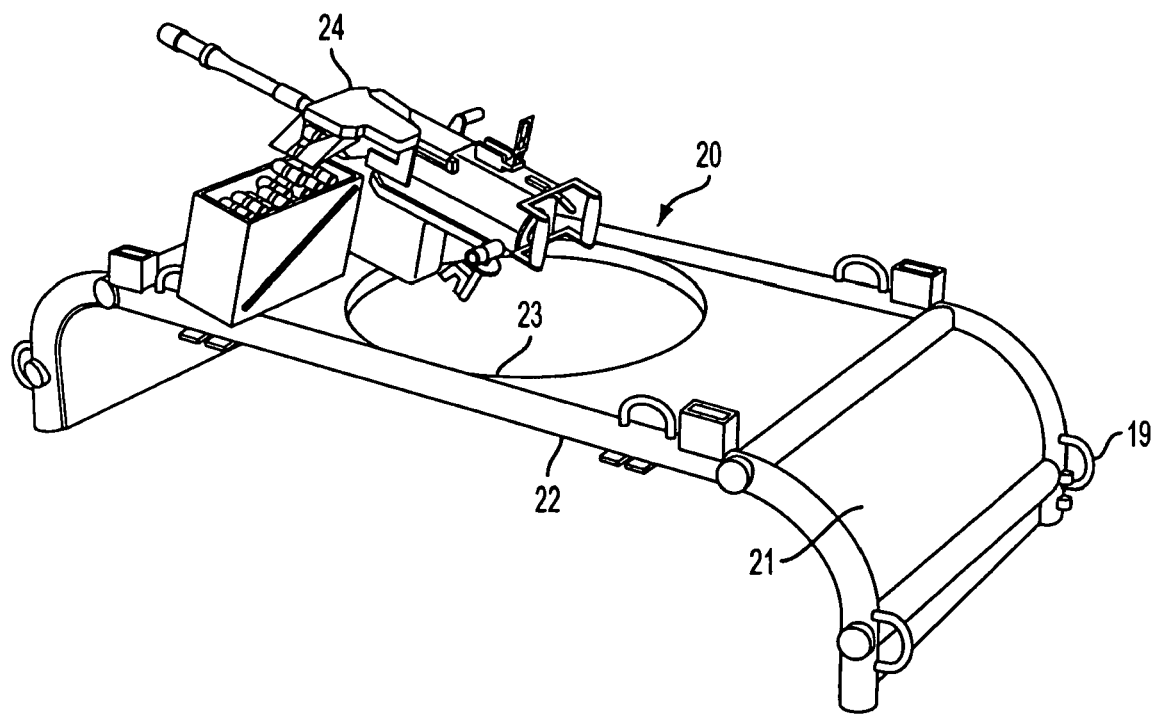
FIG. 8 is a perspective view of a unit of the modular structure in combination with a weapons system.

Once modular structure 10 arrives at a remote location, modular structure 10 may be disassembled to provide a tactical position, which may be utilized in defensive or offensive situations. Referring to FIG. 8, one of units 20 is depicted as being separate from modular structure 10, and one of weapons systems 24 is mounted to copula 23. The combination of unit 20 and weapons system 24 may be utilized, for example, to support a foxhole. More particularly, the combination of unit 20 and weapons system 24 may be positioned over a shallow hole in the ground, and an individual located within the hole may operate weapons system 24. Sandbags may also be positioned around and over unit 20 in order to further fortify the tactical position.

Figure 9:
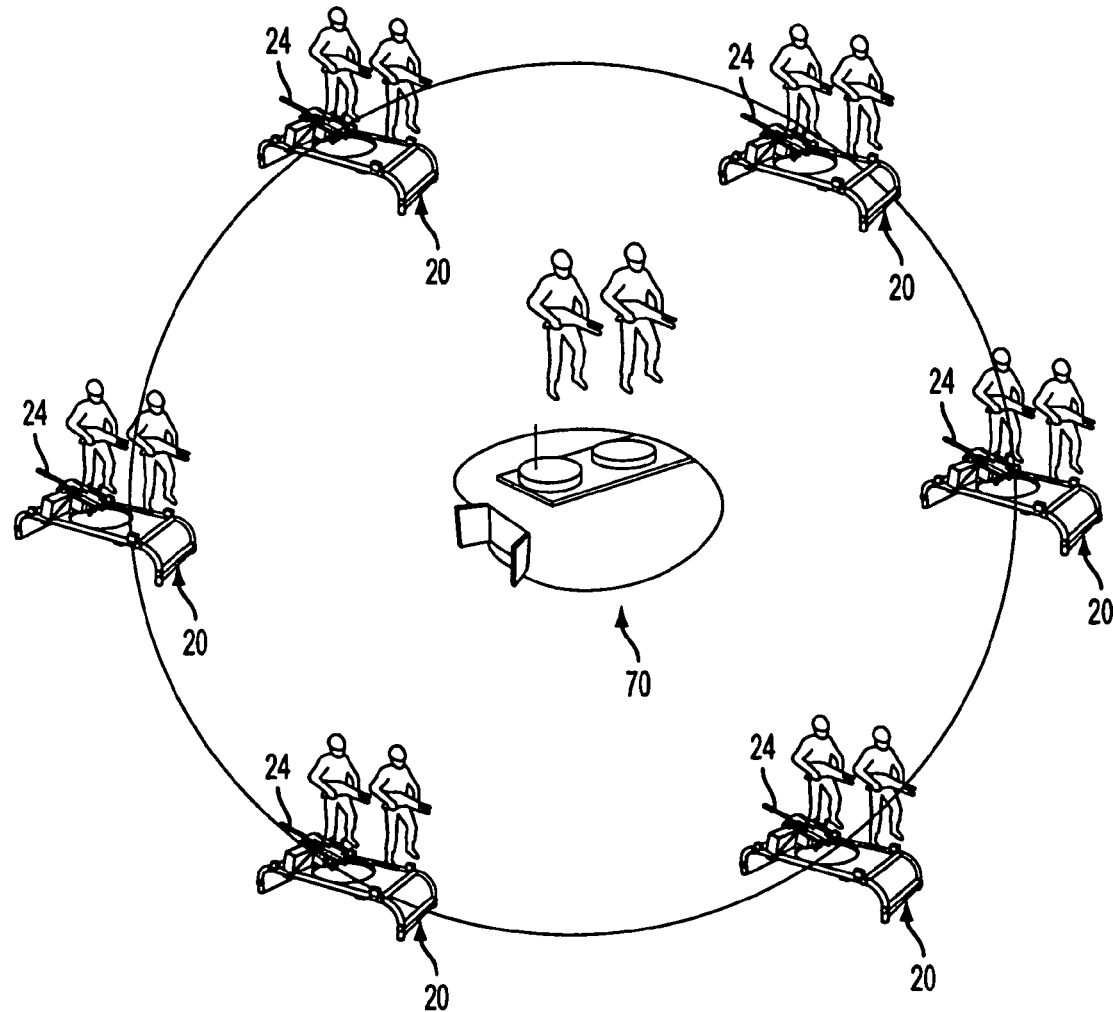
FIG. 9 is a schematic perspective view of a plurality of the units in combination with the weapons system.

A plurality of units 20 in combination with weapons systems 24 may also be distributed around a central tactical operations center 70, as depicted in FIG. 9. In general, the various combinations of units 20 and weapons systems 24 may be distributed in a circular arrangement around the tactical operations center 70. Modular structure 10 includes six units 20, and modular structure 10 also includes two units 30 and six units 40. Given that units 20 are distributed around tactical operations center 70, tactical operations center 70 may be formed from the remaining two units 30 and six units 40. That is, the remaining two units 30 and six units 40 may form another modular structure that operates as tactical operations center 70.

Figure 10:
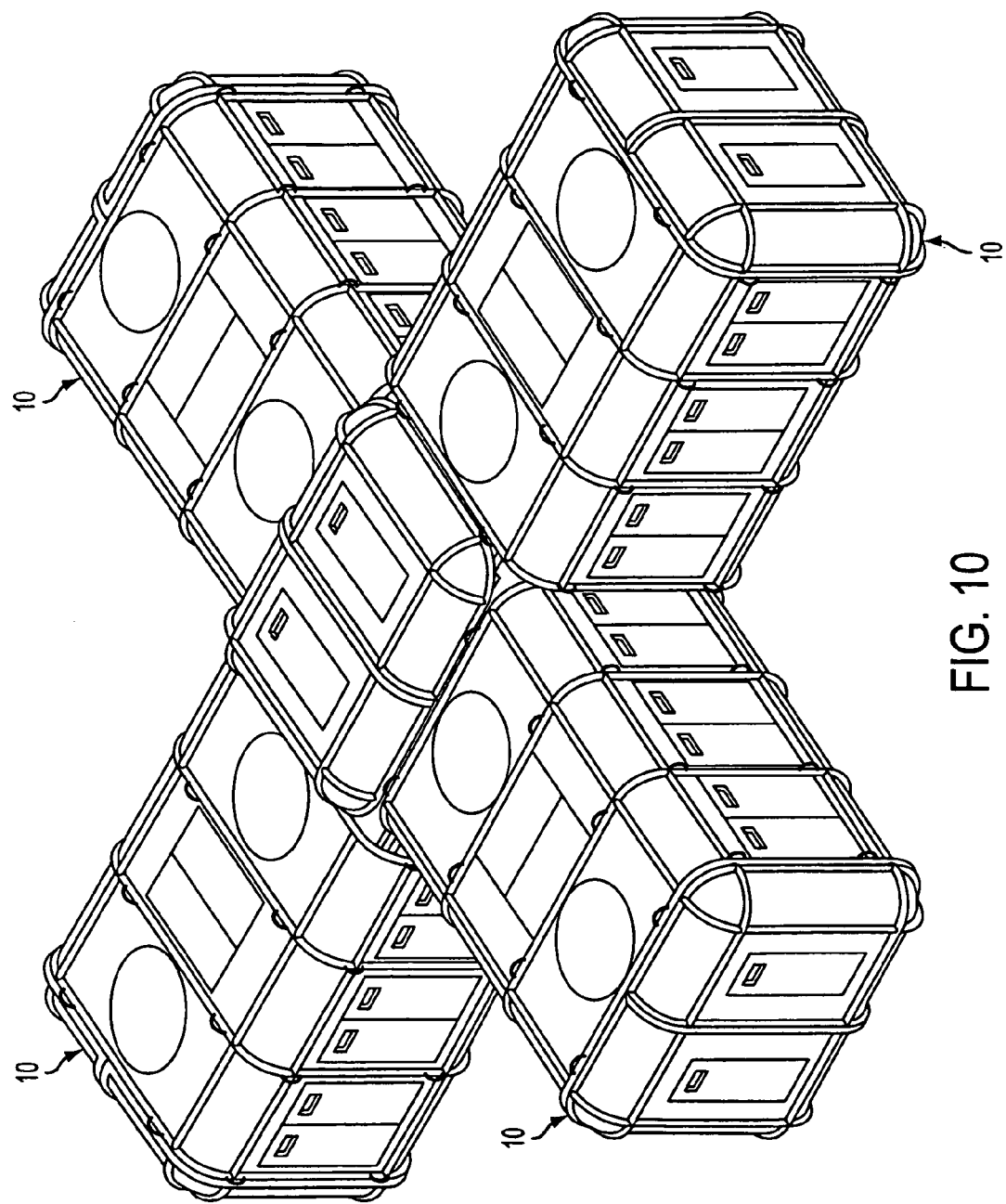
FIG. 10 is a perspective view of multiple modular structures joined together in a first configuration.
Figure 11:
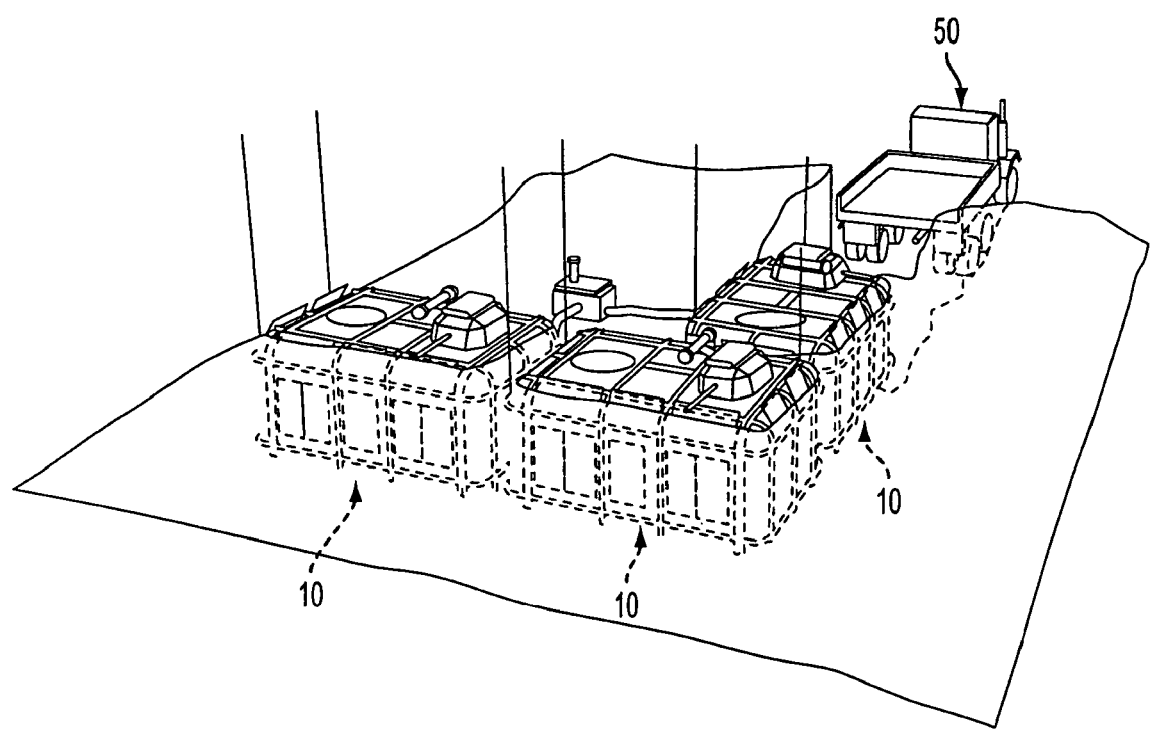
FIG. 11 is a perspective view of multiple modular structures joined together in a second configuration.

A conventional manner of providing living quarters, a check point, or a secure structure for storing equipment, for example, involves purchasing or otherwise obtaining materials at the remote location and building structures from the materials. Modular structure 10 may be utilized, however, as a structure that is suitable for living quarters, a check point, or a secure structure. That is, modular structure 10 reduces the necessity of obtaining materials at the remote location and building structures from the materials. A plurality of modular structures 10 may also be joined together, as depicted in FIG. 10, to provide a larger enclosed modular structure that may be utilized as a command post or a medical clinic, for example. Multiple modular structures 10 that include various weapons systems 24 may also be embedded within the ground, as depicted in FIG. 11, to provide a low-profile defensive position. Modular structures 10 may also be joined in a three-dimensional manner, as in FIG. 12, to provide an enclosed modular structure that is significantly larger than modular structure 10.

Figure 12:
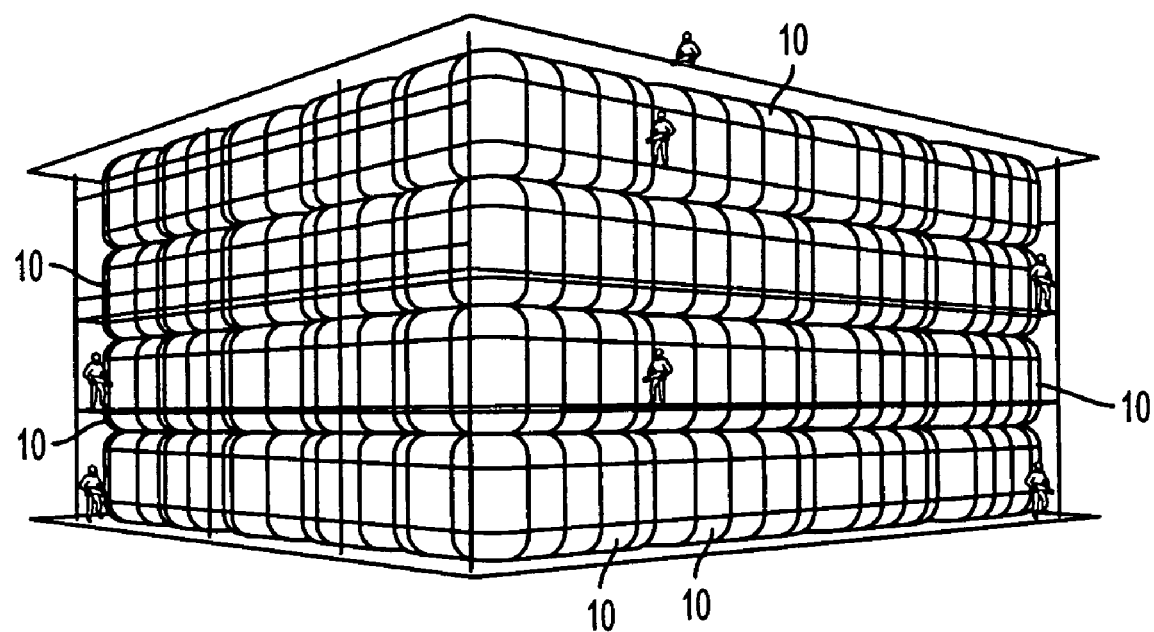
FIG. 12 is a perspective view of multiple modular structures joined together in a third configuration.

When multiple modular structures 10 are modified and joined together to form a larger modular structure, as in FIGS. 10-12, the same techniques that join units 20, 30, and 40 may be employed to join modular structures 10. In effect, joining modular structures 10 involves joining one or more units 20, 30, and 40 from a first modular structure 10 with one or more units 20, 30, and 40 from a second modular structure 10. Accordingly, pins, protrusions and apertures, temporary welds, and bolting structures, for example, may be utilized to join units 20, 30, and 40 from the first modular structure 10 with units 20, 30, and 40 from the second modular structure 10.

Figure 13A:
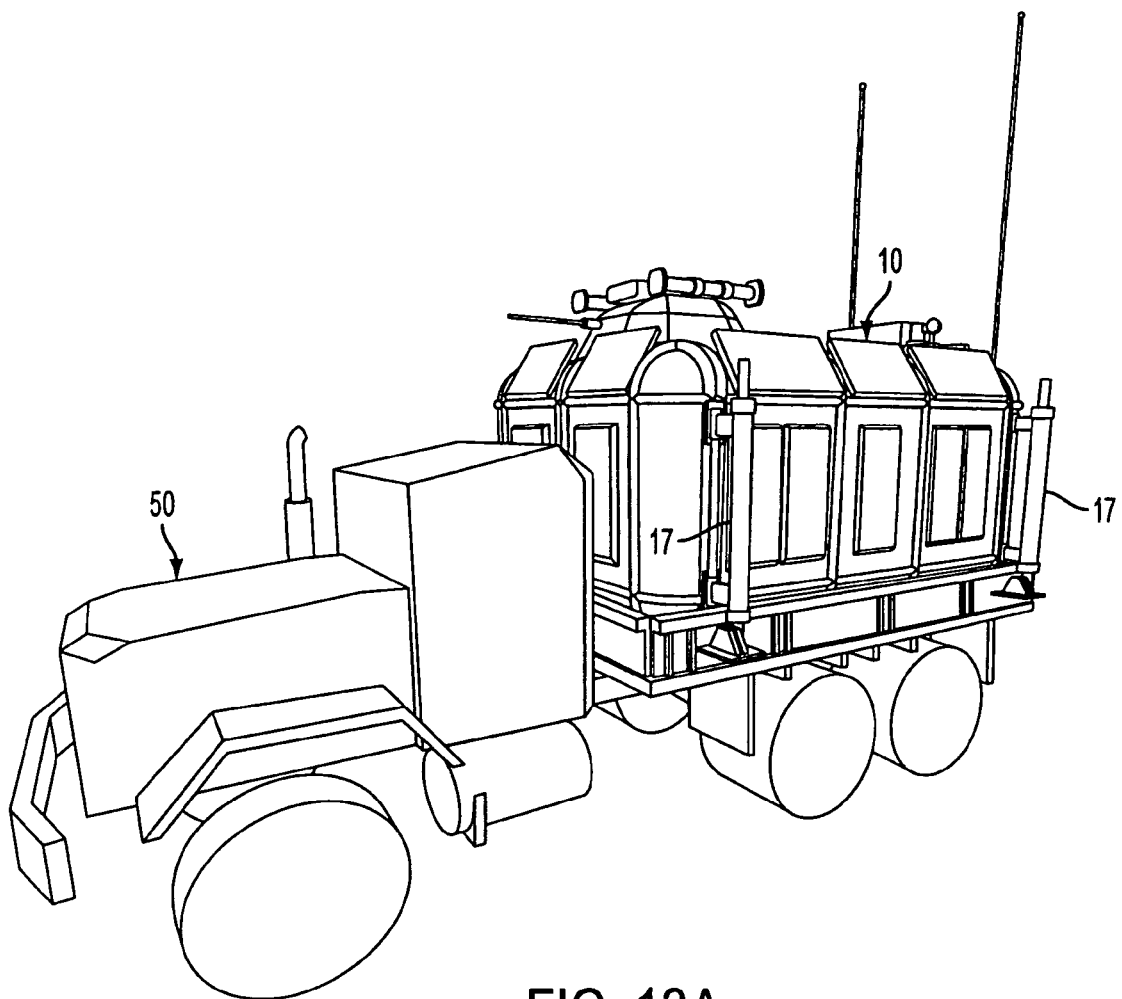
FIG. 13A is a perspective view of the modular structure with a lifting system in combination with a conventional transport.
Figure 13B:
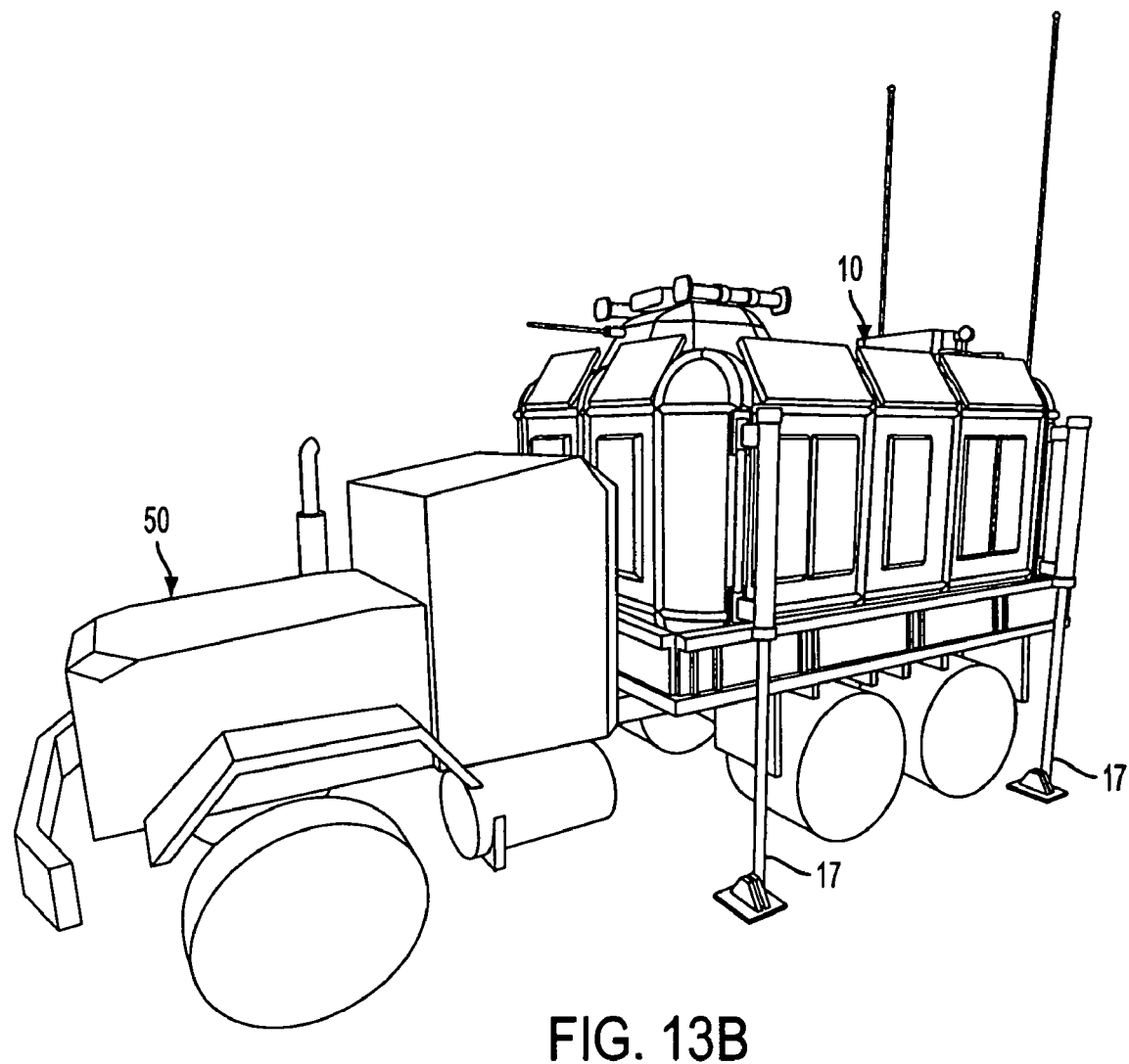
FIG. 13B is a perspective view of the modular structure with the lifting system in a first step of removal from the transport.
Figure 13C:
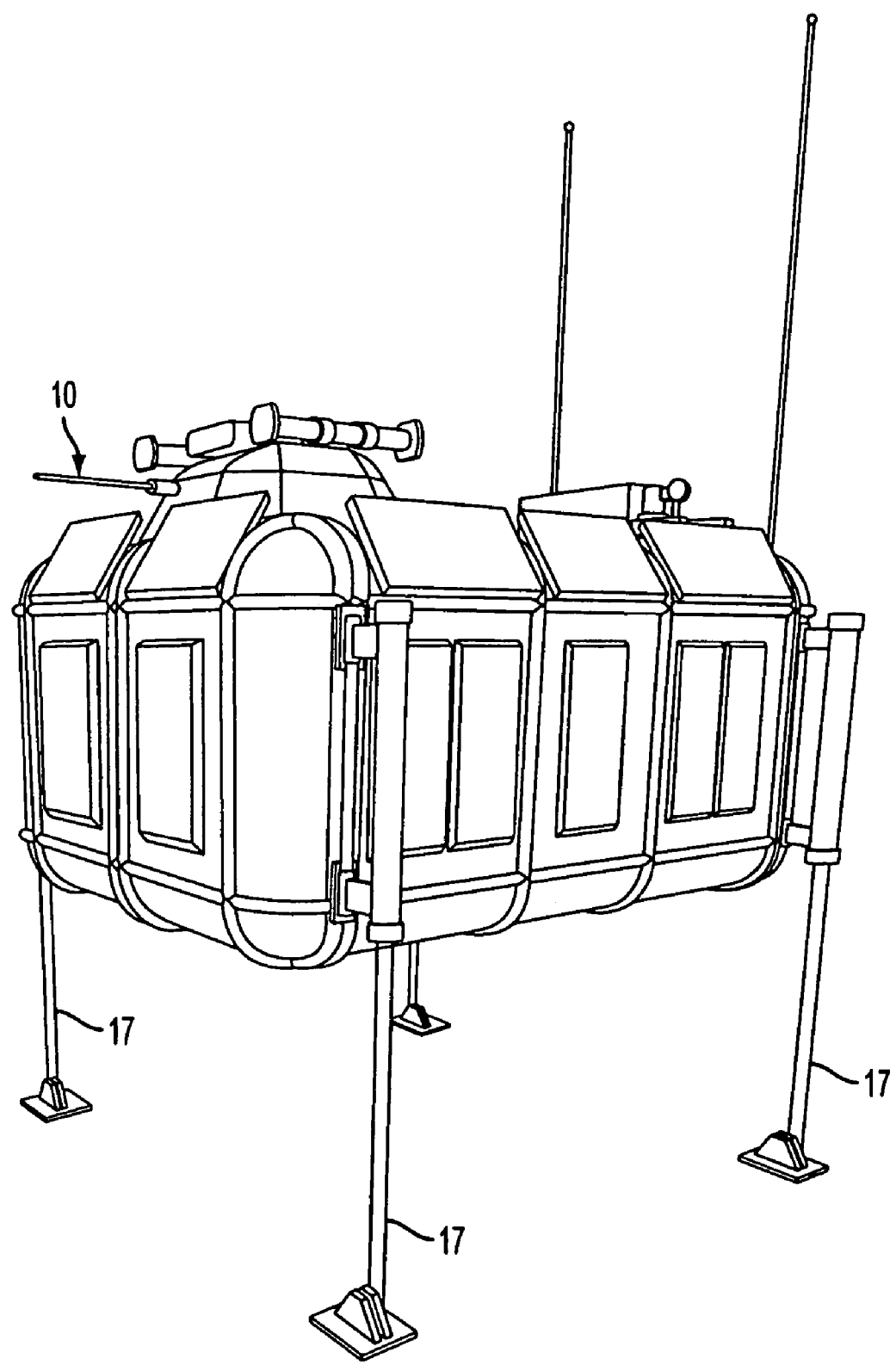
FIG. 13C is a perspective view of the modular structure with the lifting system in a second step of removal from the transport.
Figure 13D:
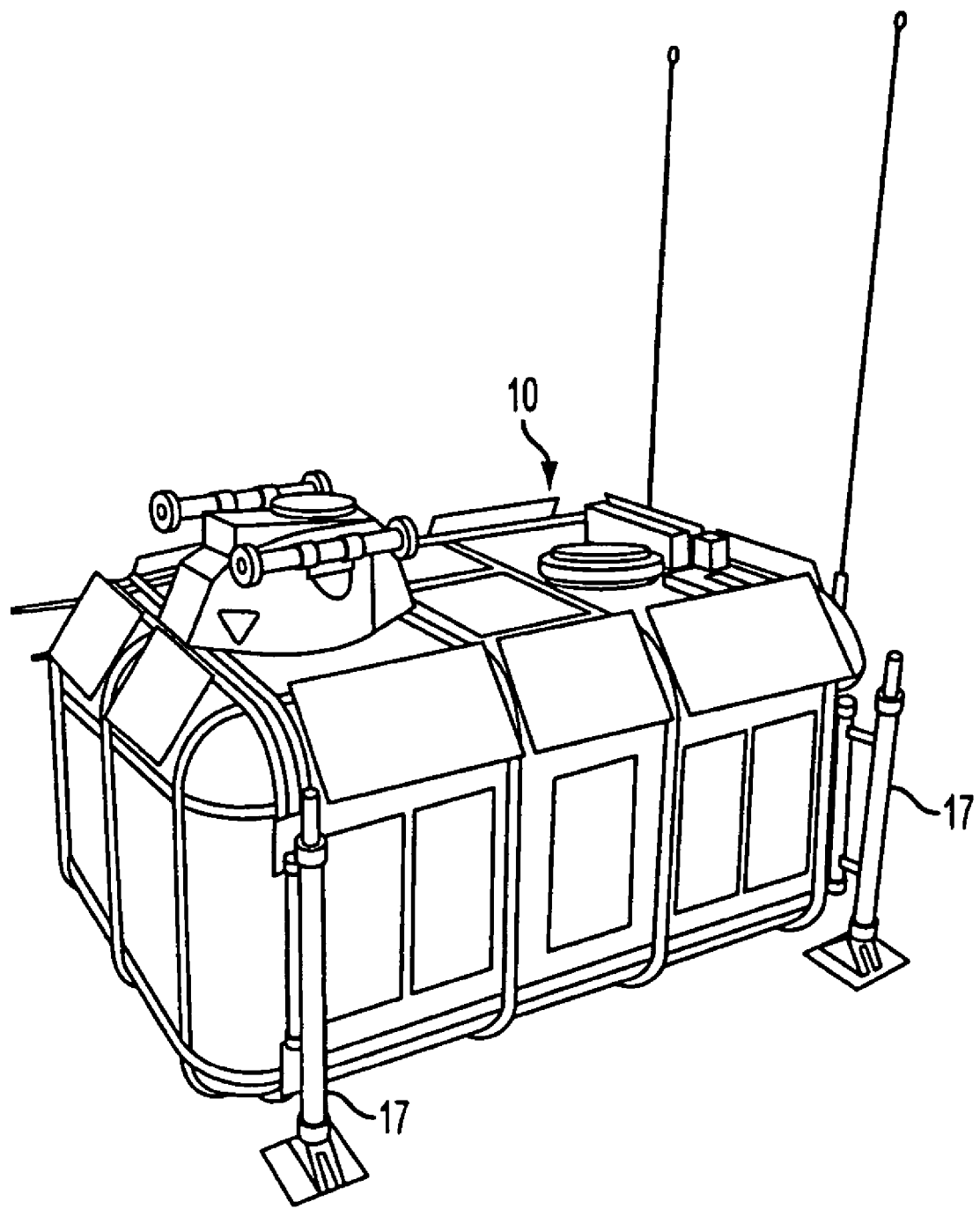
FIG. 13D is a perspective view of the modular structure with the lifting system in a third step of removal from the transport.

Various other types of equipment may also be incorporated into modular structure 10 in order to enhance the utility of modular structure 10. For example, wiring may extend through frame 12 to support power and data. More particularly, each frame portion 22, 32, and 42 may include wiring that joins with wiring in an adjacent frame portion 22, 32, and 42 to provide power and data throughout modular structure 10 or a larger modular structure, as in FIG. 12. Modular structure 10 may also include a lifting system with a plurality of extensible legs 17. Referring to FIG. 13A, legs 17 may be retracted when modular structure 10 is being transported on transport 50. When removal of modular structure 10 from transport 50 is desired, however, legs 17 may be extended, as depicted in FIG. 13B, thereby supporting modular structure 10 and lifting modular structure 10 from bed 52. Transport 50 is then moved from under modular structure 10, as depicted in FIG. 13C. Upon simultaneously retracting each of legs 17, modular structure 10 is lowered to the ground. A further benefit of legs 17 is that modular structure 10 may be effectively leveled on uneven terrain. Furthermore, in situations where heavy equipment is transported in modular structure 10, an electric or manual crane 25 may be mounted to one of copulas 24 to facilitate removal of the equipment, as depicted in FIG. 14. One or more antennas 18 may also extend from modular structure 10 to permit radio communication or the transfer of data. Antennas 18 may be secured to mounting points on frame 12, and various other mounting points may be utilized for other devices that complement radio communication or the transfer of data. In some embodiments, a plurality of attachments 19 may be incorporated into frame 12 to permit cables or other lifting devices to be secured to modular structure 10 for purposes of transport with a crane or helicopter, for example.

Based upon the above discussion, modular structure 10 and the various units 20, 30, and 40 that form modular structure 10 may be utilized as a system for the (i) transport of individuals and equipment and (ii) support of the individuals and equipment at the remote location. A military unit having a plurality of individuals, for example, may load necessary equipment into modular structure 10 at a home base. The unit may then be transported with modular structure 10 and the equipment from the home base to a remote location. The equipment remains in a modular structure 10 for the entirety of the transport, thereby minimizing breakage and loss during transport. When traveling into a hostile environment, modular structure 10 may provide protection to both the unit and the equipment. In addition, modular structure 10 will provide shelter or a tactical position at the remote location. This may be accomplished by utilizing modular structure 10 in its original configuration, joining modular structure 10 with another modular structure to form a combined enclosed space that is larger than the enclosed space within modular structure 10, or (ii) separating the units 20, 30, and 40 from modular structure 10. Accordingly, modular structure 10 provides a system of transporting and supporting the military unit throughout a military operation.

The above discussion disclosed modular structure 10 in the context of military operations for purposes of example. Modular structure 10 may also be utilized for civilian or law enforcement purposes. For example, modular structure 10 may be utilized to support medical services in hostile or non-hostile areas. In this regard, modular structure 10 may be utilized to evacuate injured individuals, and modular structure 10 may incorporate hardware for life support or the storage of medical supplies to accommodate various medical roles.

Modular structure 10 may also benefit state and local law enforcement by providing a base platform to support riot control operations, crisis intervention, evacuation, and security, for example. In some situations, extendable ladders, water cannons, or tear gas dispensers may be mounted to copulas 23. Communication arrays conventionally utilized by law enforcement agencies may also be incorporated into modular structure 10.

Modular structure 10 may also provide various forms of support to journalists assigned to hostile locations. In addition to the protecting the journalists, modular structure 10 may be utilized as a telecommunications hub. Accordingly, telecommunications equipment may be located within modular structure 10 and mounted to copulas 23 to accommodate the transfer of data.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A method of transporting cargo, the method comprising steps of:
   (a) joining a plurality of discrete units to form a modular structure that defines an enclosed space and is separate from a transport, each of the discrete units including a frame portion that supports the modular structure and an armored panel secured to the frame portion, wherein at least one edge of the modular structure formed by the plurality of discrete units is curved and wherein the armor is a polymer reinforced with para-aramid fibers;
   (b) loading the modular structure onto the transport and relocating the modular structure to a different location; and
   (c) modifying the modular structure to provide shelter or a tactical position at the different location by
      (i) joining the modular structure with another modular structure to form a combined enclosed space that is larger than the enclosed space, or
      (ii) separating the units from the modular structure.

2. The method recited in claim 1, further including a step of unloading the modular structure from the transport.

3. The method recited in claim 1, wherein the step of modifying includes distributing a portion of the units around an area to provide a tactical position.

4. The method recited in claim 1, wherein the step of loading includes locating individuals within the modular structure.

5. The method recited in claim 4, wherein the step of loading includes providing seating for the individuals within the modular structure.

6. The method recited in claim 5, wherein the step of loading includes providing safety restraints for the individuals.

7. The method of claim 1, wherein the cargo is at least one of individuals and equipment.

8. The method recited in claim 1, wherein the step of joining the modular structure with another modular structure to form a combined enclosed space that is larger than the enclosed space includes joining a first modular structure with at least a second modular structure, the second modular structure having substantially the same shape and configuration as the first modular structure.

9. The method recited in claim 1, wherein the step of joining a plurality of discrete units to form a modular structure that defines an enclosed space includes forming a modular structure having a top portion, a bottom portion and three sides.

10. The method of claim 1, wherein the plurality of discrete units includes a first plurality of discrete units each having a flat armored panel and straight frame portions and a second plurality of discrete units each having a curved armored panel and curved frame portions.

11. The method of claim 10, wherein the step of joining the plurality of discrete units includes joining at least one discrete unit of the first plurality with at least one discrete unit of the second plurality to form a portion of a top portion having a curved edge.

12. The method of claim 1, further comprising the step of configuring a portion of the modular structure to include a weapons system.

13. A method of transporting individuals, the method comprising steps of:
   (a) joining a plurality of discrete units to form a modular structure that defines an enclosed space and is separate from a transport, each of the discrete units including a frame portion that supports the modular structure, the modular structure having at least one exterior curved edge;
   (b) providing seating and safety restraints for the individuals within the modular structure;
   (c) loading the modular structure onto the transport;
   (d) locating the individuals within the modular structure;
   (e) relocating the modular structure and the individuals to a different location; and
   (f) at least partially disassembling the modular structure at the different location.

14. The method recited in claim 13, further including a step of unloading the modular structure from the transport.

15. The method recited in claim 13, wherein the step of at least partially disassembling includes distributing a portion of the units around an area to provide a tactical position.

16. The method recited in claim 13, wherein the step of at least partially disassembling includes modifying the modular structure to provide shelter or a tactical position at the different location by
   (i) joining the modular structure with another modular structure to form a combined enclosed space that is larger than the enclosed space, or
   (ii) separating the units from the modular structure.

17. The method recited in claim 16, wherein the step of joining the modular structure with another modular structure to form a combined enclosed space that is larger than the enclosed space includes joining a first modular structure with at least a second modular structure, the second modular structure having substantially the same shape and configuration as the first modular structure.

18. The method recited in claim 13, wherein the step of locating the individuals includes locating equipment within the modular structure.

19. The method recited in claim 13, wherein the step of joining a plurality of discrete units to form a modular structure that defines an enclosed space and is separate from a transport includes forming a modular structure having at least a top portion, a bottom portion and three side portions.

20. The method of claim 13, wherein the plurality of discrete units includes a first plurality of discrete units each having a flat armored panel and straight frame portions and a second plurality of discrete units each having a curved armored panel and curved frame portions.

21. The method of claim 20, wherein the step of joining the plurality of discrete units includes joining at least one discrete unit of the first plurality with at least one discrete unit of the second plurality to form a portion of a top portion having a curved edge.

* * * * *